(12) United States Patent
Chizawa

(10) Patent No.: US 7,391,532 B2
(45) Date of Patent: Jun. 24, 2008

(54) IMAGE CORRECTION IN IMAGE SENSING SYSTEM INCLUDING IMAGE SENSING APPARATUS AND IMAGE PROCESSING APPARATUS

(75) Inventor: Noriyoshi Chizawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 09/772,658

(22) Filed: Jan. 30, 2001

(65) Prior Publication Data

US 2001/0033395 A1    Oct. 25, 2001

(30) Foreign Application Priority Data

| Feb. 1, 2000 | (JP) | .............................. 2000-024390 |
| Feb. 3, 2000 | (JP) | .............................. 2000-026417 |
| Apr. 13, 2000 | (JP) | .............................. 2000-112415 |

(51) Int. Cl.
   H04N 1/50    (2006.01)
   H04N 1/40    (2006.01)

(52) U.S. Cl. .................. 358/1.9; 358/442; 358/461; 382/274

(58) Field of Classification Search .............. 358/1.9, 358/461, 504, 505, 509, 515, 518, 523, 406, 358/519, 520, 514; 382/274
   See application file for complete search history.

(56) References Cited

U.S. PATENT DOCUMENTS

| 4,679,074 A | * | 7/1987 | Sugiura et al. | ............... 358/523 |
| 5,309,258 A | * | 5/1994 | Kouno et al. | ................ 358/523 |
| 5,371,613 A | * | 12/1994 | Arimoto et al. | ............. 358/461 |
| 5,701,505 A | * | 12/1997 | Yamashita et al. | ............ 712/11 |
| 5,771,106 A | * | 6/1998 | Taguchi et al. | .............. 358/461 |
| 5,875,260 A | * | 2/1999 | Ohta | ........................ 382/162 |
| 6,055,074 A | * | 4/2000 | Himoto | ...................... 358/518 |
| 6,072,912 A | * | 6/2000 | Orito | ......................... 382/274 |
| 6,198,550 B1 | | 3/2001 | Toyoda | ...................... 358/514 |
| 6,603,885 B1 | | 8/2003 | Enomoto | |
| 6,728,008 B1 | * | 4/2004 | Kamisuwa | .................. 358/474 |

FOREIGN PATENT DOCUMENTS

| JP | 6-14204 | 1/1994 |
| JP | 9-46535 | 2/1997 |
| JP | 9-51436 | 2/1997 |

(Continued)

OTHER PUBLICATIONS

Japanese Office Action dated Aug. 19, 2005 of basic Japanese Patent Application No. 2000-112415 with English Translation.

(Continued)

Primary Examiner—Edward L. Coles
Assistant Examiner—James A. Thompson
(74) Attorney, Agent, or Firm—Morgan & Finnegan, L.L.P.

(57) ABSTRACT

In an image scanning system which includes an image scanning apparatus for scanning an image using a solid-state image sensing element, and an image processing apparatus, the scanned image undergoes image correction. The image scanning apparatus informs the image processing apparatus of image scan characteristic data such as linearity characteristic data unique to itself. The image processing apparatus executes a correction process of an image scanned by the image scanning apparatus using the received image scan characteristic data.

14 Claims, 29 Drawing Sheets

FOREIGN PATENT DOCUMENTS

| | | |
|---|---|---|
| JP | 9-149270 | 6/1997 |
| JP | 10-224646 | 8/1998 |
| JP | 11-164162 | 6/1999 |
| JP | 11-041400 A2 | 12/1999 |
| JP | 2000-92309 | 3/2000 |
| JP | 9321940 | 10/2006 |

OTHER PUBLICATIONS

English Translation of Office Action dated Sep. 22, 2004 of Japanese Patent Application No. 2000-024390.

English Translation of Office Action dated Nov. 22, 2004 of Japanese Patent Application No. 2000-112415.

English Translation of Office Action dated Nov. 24, 2004 of Japanese Patent Application No. 2000-026417.

Japanese Office Action dated Sep. 22, 2006 (JP Appln. No. 2000-112415).

* cited by examiner

FIG. 3

| IDEAL VALUE | MEASURED VALUE | | | IDEAL VALUE | MEASURED VALUE | | | IDEAL VALUE | MEASURED VALUE | | | IDEAL VALUE | MEASURED VALUE | | |
|---|---|---|---|---|---|---|---|---|---|---|---|---|---|---|---|
| | RED | Green | Blue | | RED | Green | Blue | | RED | Green | Blue | | RED | Green | Blue |
| 0 | 0 | 0 | 0 | 64 | 73 | 52 | 66 | 128 | 137 | 115 | 130 | 192 | 198 | 184 | 193 |
| 1 | 2 | 0 | 1 | 65 | 75 | 53 | 67 | 129 | 138 | 116 | 131 | 193 | 198 | 185 | 194 |
| 2 | 3 | 1 | 2 | 66 | 76 | 54 | 68 | 130 | 139 | 118 | 132 | 194 | 199 | 186 | 195 |
| 3 | 5 | 2 | 3 | 67 | 77 | 55 | 69 | 131 | 140 | 119 | 133 | 195 | 200 | 187 | 196 |
| 4 | 6 | 2 | 4 | 68 | 78 | 56 | 70 | 132 | 141 | 120 | 134 | 196 | 201 | 188 | 197 |
| 5 | 7 | 3 | 5 | 69 | 79 | 57 | 71 | 133 | 142 | 121 | 135 | 197 | 202 | 190 | 198 |
| 6 | 9 | 3 | 6 | 70 | 80 | 58 | 72 | 134 | 143 | 122 | 136 | 198 | 203 | 191 | 199 |
| 7 | 10 | 4 | 8 | 71 | 81 | 59 | 73 | 135 | 144 | 123 | 137 | 199 | 204 | 192 | 200 |
| 8 | 11 | 5 | 9 | 72 | 82 | 60 | 74 | 136 | 145 | 124 | 138 | 200 | 205 | 193 | 201 |
| 9 | 13 | 5 | 10 | 73 | 83 | 61 | 75 | 137 | 146 | 125 | 139 | 201 | 206 | 194 | 202 |
| 10 | 14 | 6 | 11 | 74 | 84 | 61 | 76 | 138 | 147 | 126 | 140 | 202 | 207 | 195 | 203 |
| 11 | 15 | 7 | 12 | 75 | 85 | 62 | 77 | 139 | 148 | 127 | 141 | 203 | 208 | 196 | 204 |
| 12 | 16 | 8 | 13 | 76 | 86 | 63 | 78 | 140 | 149 | 128 | 142 | 204 | 209 | 197 | 205 |
| 13 | 18 | 8 | 14 | 77 | 87 | 64 | 79 | 141 | 150 | 129 | 143 | 205 | 210 | 198 | 206 |
| 14 | 19 | 9 | 15 | 78 | 88 | 65 | 80 | 142 | 151 | 130 | 144 | 206 | 210 | 200 | 207 |
| 15 | 20 | 10 | 16 | 79 | 89 | 66 | 81 | 143 | 152 | 131 | 145 | 207 | 211 | 201 | 208 |
| 16 | 21 | 11 | 17 | 80 | 90 | 67 | 82 | 144 | 152 | 132 | 146 | 208 | 212 | 202 | 209 |
| 17 | 22 | 11 | 18 | 81 | 91 | 68 | 83 | 145 | 153 | 133 | 147 | 209 | 213 | 203 | 210 |
| 18 | 23 | 12 | 19 | 82 | 92 | 69 | 84 | 146 | 154 | 134 | 148 | 210 | 214 | 204 | 211 |
| 19 | 25 | 13 | 20 | 83 | 93 | 70 | 85 | 147 | 155 | 135 | 149 | 211 | 215 | 205 | 212 |
| 20 | 26 | 14 | 21 | 84 | 94 | 71 | 86 | 148 | 156 | 136 | 150 | 212 | 216 | 206 | 213 |
| 21 | 27 | 14 | 22 | 85 | 95 | 72 | 87 | 149 | 157 | 137 | 151 | 213 | 217 | 207 | 214 |
| 22 | 28 | 15 | 23 | 86 | 96 | 73 | 88 | 150 | 158 | 139 | 152 | 214 | 218 | 208 | 215 |
| 23 | 29 | 16 | 24 | 87 | 97 | 74 | 89 | 151 | 159 | 140 | 153 | 215 | 219 | 210 | 216 |
| 24 | 30 | 17 | 25 | 88 | 98 | 75 | 90 | 152 | 160 | 141 | 154 | 216 | 220 | 211 | 217 |
| 25 | 32 | 18 | 26 | 89 | 99 | 76 | 91 | 153 | 161 | 142 | 155 | 217 | 221 | 212 | 218 |
| 26 | 33 | 18 | 27 | 90 | 100 | 77 | 92 | 154 | 162 | 143 | 156 | 218 | 221 | 213 | 219 |
| 27 | 34 | 19 | 28 | 91 | 101 | 78 | 93 | 155 | 163 | 144 | 157 | 219 | 222 | 214 | 220 |
| 28 | 35 | 20 | 29 | 92 | 102 | 79 | 94 | 156 | 164 | 145 | 158 | 220 | 223 | 215 | 221 |
| 29 | 36 | 21 | 30 | 93 | 103 | 80 | 95 | 157 | 165 | 146 | 159 | 221 | 224 | 216 | 222 |
| 30 | 37 | 22 | 31 | 94 | 104 | 81 | 96 | 158 | 166 | 147 | 160 | 222 | 225 | 217 | 223 |
| 31 | 38 | 23 | 32 | 95 | 105 | 82 | 97 | 159 | 167 | 148 | 161 | 223 | 226 | 219 | 224 |
| 32 | 39 | 23 | 33 | 96 | 106 | 83 | 98 | 160 | 168 | 149 | 161 | 224 | 227 | 220 | 225 |
| 33 | 40 | 24 | 34 | 97 | 107 | 84 | 99 | 161 | 169 | 150 | 162 | 225 | 228 | 221 | 226 |
| 34 | 42 | 25 | 35 | 98 | 108 | 85 | 100 | 162 | 170 | 151 | 163 | 226 | 229 | 222 | 227 |
| 35 | 43 | 26 | 36 | 99 | 109 | 86 | 101 | 163 | 170 | 152 | 164 | 227 | 230 | 223 | 228 |
| 36 | 44 | 27 | 37 | 100 | 110 | 87 | 102 | 164 | 171 | 153 | 165 | 228 | 231 | 224 | 229 |
| 37 | 45 | 28 | 38 | 101 | 111 | 88 | 103 | 165 | 172 | 155 | 166 | 229 | 231 | 225 | 229 |
| 38 | 46 | 29 | 39 | 102 | 112 | 89 | 104 | 166 | 173 | 156 | 167 | 230 | 232 | 226 | 230 |
| 39 | 47 | 29 | 40 | 103 | 113 | 90 | 105 | 167 | 174 | 157 | 168 | 231 | 233 | 228 | 231 |
| 40 | 48 | 30 | 42 | 104 | 114 | 91 | 106 | 168 | 175 | 158 | 169 | 232 | 234 | 229 | 232 |
| 41 | 49 | 31 | 43 | 105 | 115 | 92 | 107 | 169 | 176 | 159 | 170 | 233 | 235 | 230 | 233 |
| 42 | 50 | 32 | 44 | 106 | 116 | 93 | 108 | 170 | 177 | 160 | 171 | 234 | 236 | 231 | 234 |
| 43 | 51 | 33 | 45 | 107 | 117 | 94 | 109 | 171 | 178 | 161 | 172 | 235 | 237 | 232 | 235 |
| 44 | 52 | 34 | 46 | 108 | 118 | 95 | 110 | 172 | 179 | 162 | 173 | 236 | 238 | 233 | 236 |
| 45 | 54 | 35 | 47 | 109 | 119 | 96 | 111 | 173 | 180 | 163 | 174 | 237 | 239 | 234 | 237 |
| 46 | 55 | 36 | 48 | 110 | 120 | 97 | 112 | 174 | 181 | 164 | 175 | 238 | 240 | 236 | 238 |
| 47 | 56 | 36 | 49 | 111 | 121 | 98 | 113 | 175 | 182 | 165 | 176 | 239 | 241 | 237 | 239 |
| 48 | 57 | 37 | 50 | 112 | 122 | 99 | 114 | 176 | 183 | 166 | 177 | 240 | 241 | 238 | 240 |
| 49 | 58 | 38 | 51 | 113 | 123 | 100 | 115 | 177 | 184 | 168 | 178 | 241 | 242 | 239 | 241 |
| 50 | 59 | 39 | 52 | 114 | 124 | 101 | 116 | 178 | 185 | 169 | 179 | 242 | 243 | 240 | 242 |
| 51 | 60 | 40 | 53 | 115 | 125 | 102 | 117 | 179 | 185 | 170 | 180 | 243 | 244 | 241 | 243 |
| 52 | 61 | 41 | 54 | 116 | 126 | 103 | 118 | 180 | 186 | 171 | 181 | 244 | 245 | 242 | 244 |
| 53 | 62 | 42 | 55 | 117 | 126 | 104 | 119 | 181 | 187 | 172 | 182 | 245 | 246 | 244 | 245 |
| 54 | 63 | 43 | 56 | 118 | 127 | 105 | 120 | 182 | 188 | 173 | 183 | 246 | 247 | 245 | 246 |
| 55 | 64 | 44 | 57 | 119 | 128 | 106 | 121 | 183 | 189 | 174 | 184 | 247 | 248 | 246 | 247 |
| 56 | 65 | 45 | 58 | 120 | 129 | 107 | 122 | 184 | 190 | 175 | 185 | 248 | 249 | 247 | 248 |
| 57 | 66 | 46 | 59 | 121 | 130 | 108 | 123 | 185 | 191 | 176 | 186 | 249 | 250 | 248 | 249 |
| 58 | 67 | 46 | 60 | 122 | 131 | 109 | 124 | 186 | 192 | 177 | 187 | 250 | 250 | 249 | 250 |
| 59 | 68 | 47 | 61 | 123 | 132 | 110 | 125 | 187 | 193 | 178 | 188 | 251 | 251 | 250 | 251 |
| 60 | 69 | 48 | 62 | 124 | 133 | 111 | 126 | 188 | 194 | 180 | 189 | 252 | 252 | 252 | 252 |
| 61 | 70 | 49 | 63 | 125 | 134 | 112 | 127 | 189 | 195 | 181 | 190 | 253 | 253 | 253 | 253 |
| 62 | 71 | 50 | 64 | 126 | 135 | 113 | 128 | 190 | 196 | 182 | 191 | 254 | 254 | 254 | 254 |
| 63 | 72 | 51 | 65 | 127 | 136 | 114 | 129 | 191 | 197 | 183 | 192 | 255 | 255 | 255 | 255 |

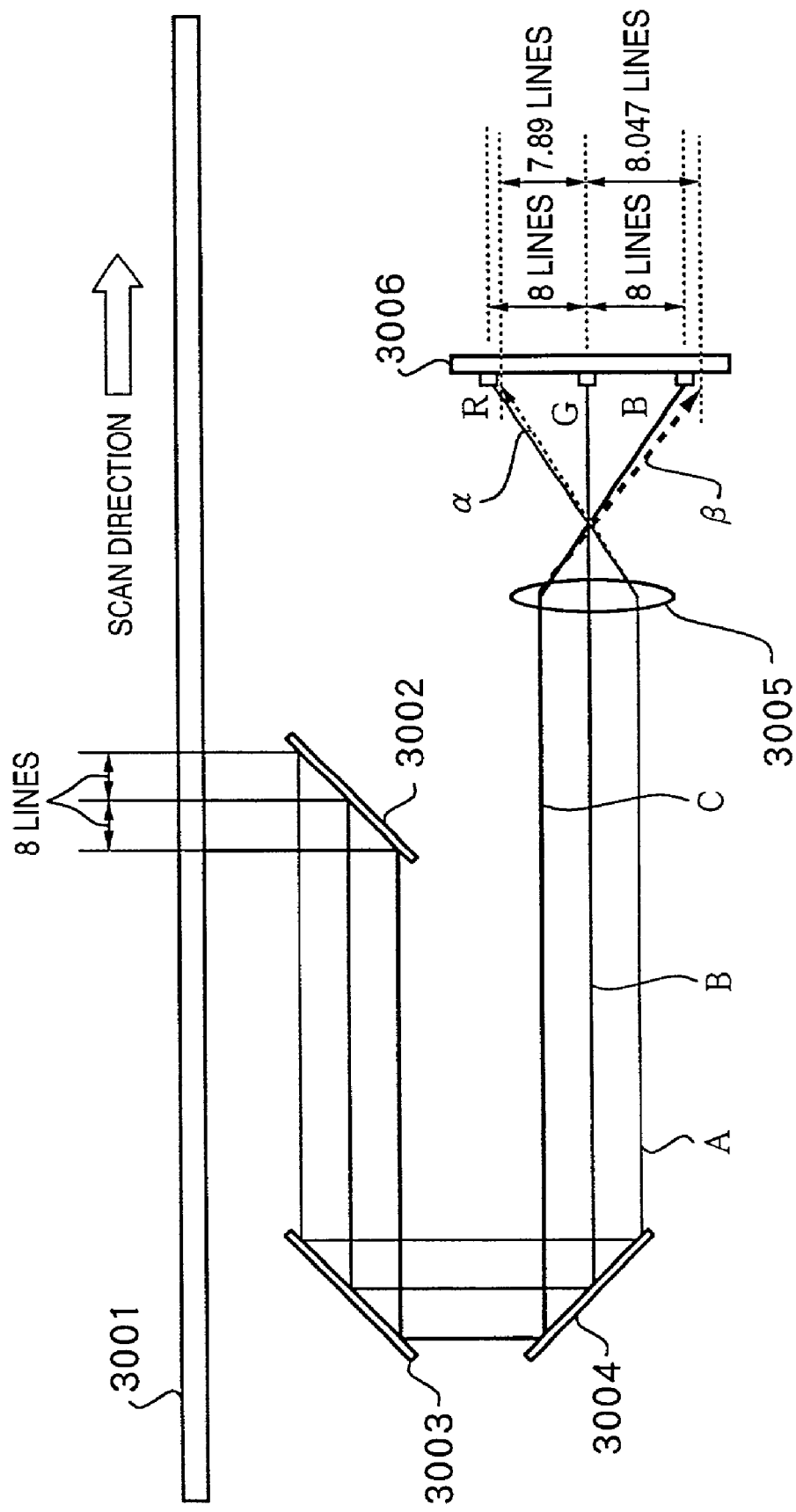

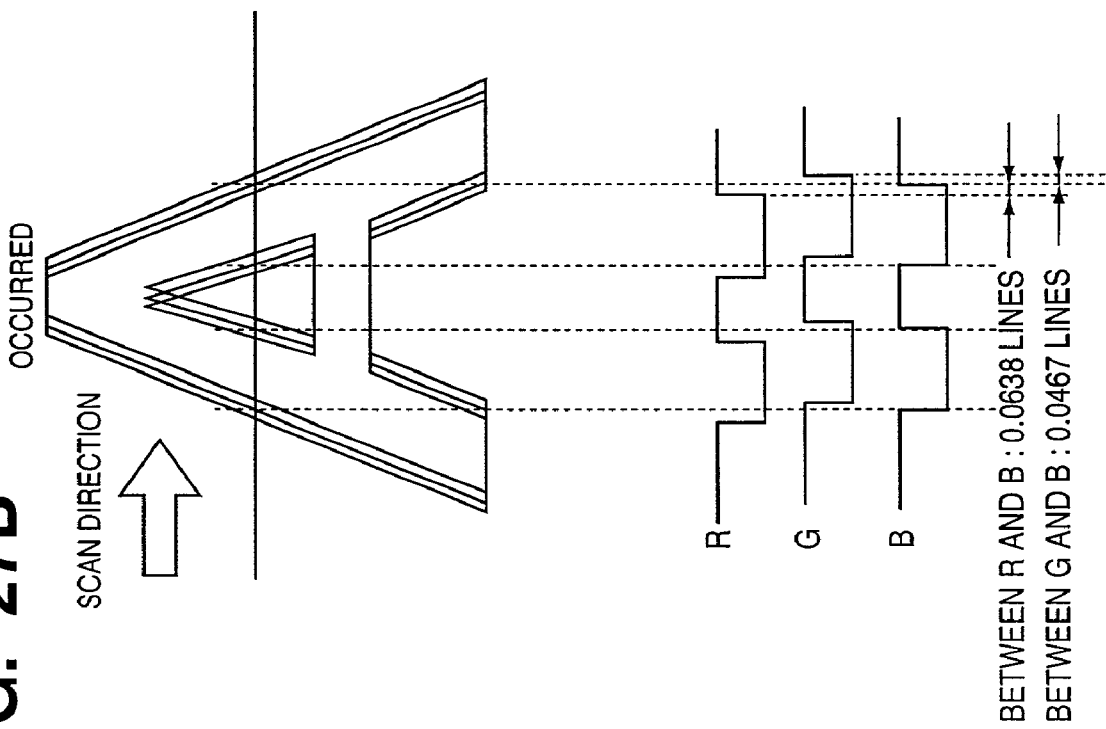
FIG. 27A IDEAL STATE
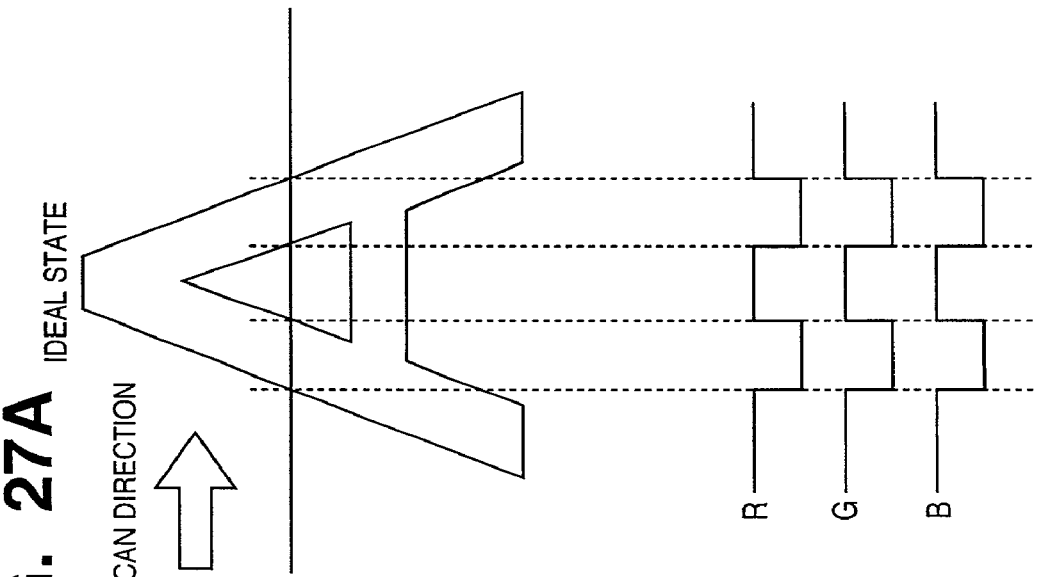
FIG. 27B COLOR MISREGISTRATION OCCURRED
BETWEEN R AND B : 0.0638 LINES
BETWEEN G AND B : 0.0467 LINES

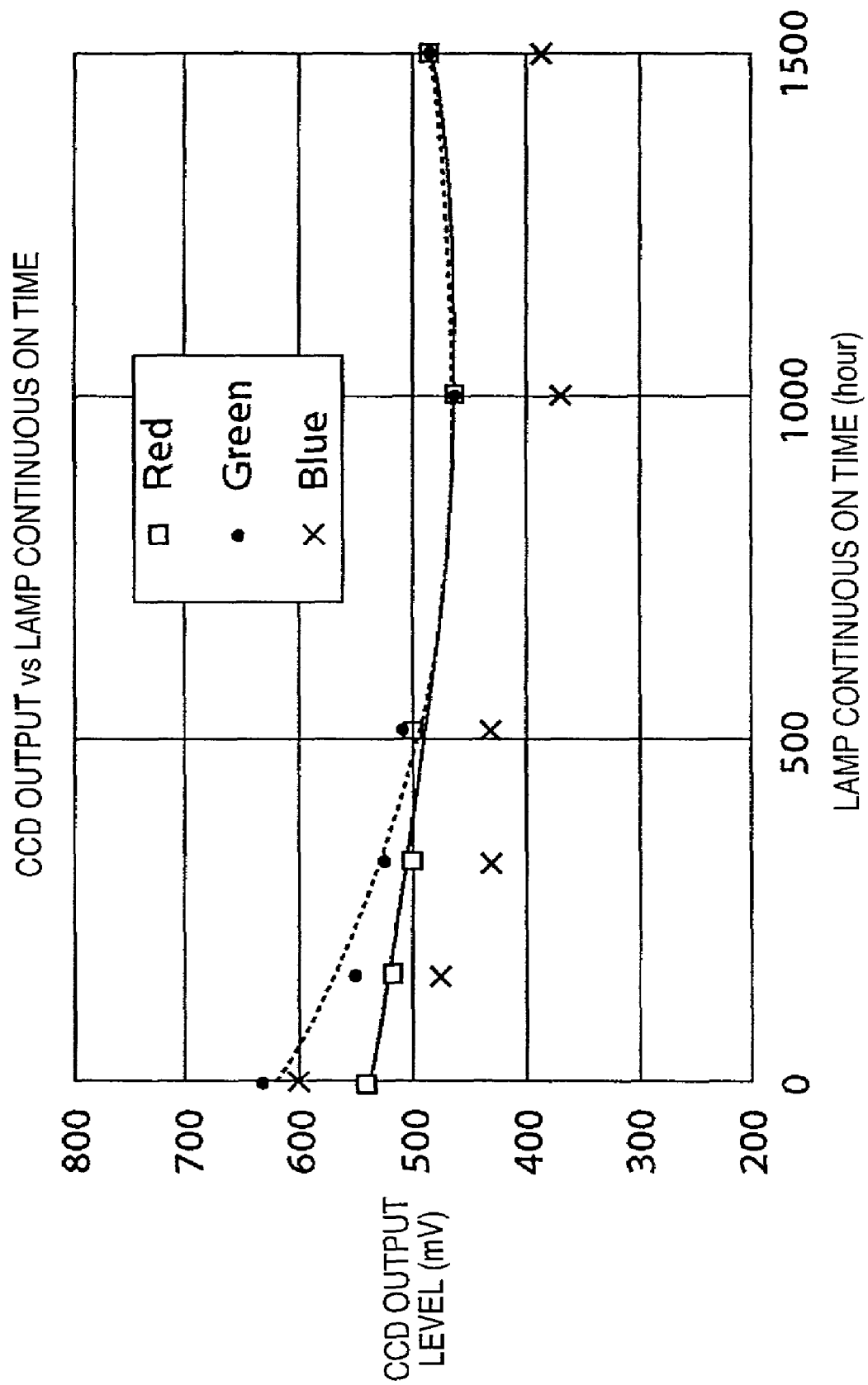

ary, a full-color image scanner of cost-down version, and the like can be easily connected, thus allowing easy version up and exchange of the system.

IMAGE CORRECTION IN IMAGE SENSING SYSTEM INCLUDING IMAGE SENSING APPARATUS AND IMAGE PROCESSING APPARATUS

FIELD OF THE INVENTION

The present invention relates to image correction in an image sensing system that includes an image sensing apparatus for sensing an image using a solid-state image sensing element, and an image processing apparatus and, more particularly, to image correction for an image sensed by the image sensing apparatus.

BACKGROUND OF THE INVENTION

FIG. 25 shows an example of the system arrangement of a conventional digital copying machine.

Referring to FIG. 25, reference numeral 4001 denotes an image scanner as an apparatus for scanning a document image; and 4002, a printer for outputting a document image scanned by the image scanner 4001. The printer 4002 includes a controller for rasterizing print data (e.g., PDL data) sent from a computer (to be described later), and processes a print request from the computer. The controller can execute a process for outputting the document image scanned by the image scanner to the computer apparatus, thereby providing a function of a network scanner.

Generally, the network scanner processes images in a compression format such as JPEG or the like.

Reference numeral 4003 denotes a scanner connection cable. The scanner connection cable 4003 connects the image scanner 4001 and printer 4002, and its specification differs depending on manufacturers.

Reference numeral 4004 denotes a control panel which is controlled by the controller of the printer 4002, displays information such as designated, trimming, and color conversion of a scanned image, status monitor of expendables, and the like in addition to the designated copying or network scan operation, and allows the user to interactively make various setups.

Reference numeral 4005 denotes a control panel cable for connecting the control panel 4004 and the controller of the printer 4002; 4006a, 4006b, and 4006c, computer terminals; 4007, a printer server; and 4008, a network line.

Print data output from each of the computer terminals 4006a to 4006c is sent to the printer server 4007 via the network line 4008, and is then sent from the printer server 4007 to the printer 4006 via the network line 4008, thus executing a print process.

The digital copying machine system that adopts the aforementioned separate arrangement has the following features.

1. System Expandability

Since the image scanner 4001 and printer 4002 are separately arranged, the system can be expanded from a printer to a digital copying machine by adding the image scanner 4001 after the printer 4002 is purchased.

2. Connection Among Different Models

By standardizing interfaces of the image scanner 4001 and printer 4002, different models can be connected.

For example, full-color and monochrome image scanners can be selectively connected to the printer 4002.

Also, various models of full-color image scanners such as a full-color image scanner that can achieve high image qual- 3. Easy Development Since the image scanner 4001 and printer 4002 can be independently developed, the development period can be shortened, and new functions can be easily added.

However, in the prior art, since the image scanner and printer are separately arranged, if different models are connected, the following problems may be posed:

1. tone reproduction mismatch
2. color reproduction mismatch

These problems are posed since individual image scanner models have different linearity characteristics.

Different linearity characteristics in units of models depend on the characteristics of devices such as a CCD image sensor, sample & hold circuit, gain adjustment circuit, A/D converter, and the like used in an image scan process.

Furthermore, the following problems may also be posed.

(1) image quality mismatch upon connecting different models (2) image quality mismatch among individual units of identical models (3) image quality mismatch after an optical unit is exchanged "Image quality" indicates the quality of text and edges, and is determined especially by imaging performance of a light beam on a CCD line sensor. The causes and principle of generation of the problems will be explained below with reference to FIGS. 26 and 27.

FIG. 26 shows the path of a light beam from a document to a CCD imaging surface. Reference numeral 3001 denotes a platen glass on which a document (not shown) is placed. Reference numerals 3002, 3003, and 3004 denote first, second, and third mirrors. The first, second, and third mirrors 3002, 3003, and 3004 form an optical system for guiding light reflected by the document surface to a CCD line sensor 3006, and the first mirror 3002 and a unit of the second and third mirrors 3003 and 3004 are driven at a speed ratio of 2:1 in a scan direction while maintaining an optical path length upon scanning the document.

Reference numeral 3005 denotes an optical lens for imaging light reflected by the document on the CCD line sensor 3006, and is formed by building a plurality of lenses in a lens barrel. Reference numeral 3006 denotes a CCD line sensor which is a 3-line color sensor having three arrays, i.e., R, G, and B, photodiode arrays. The three photodiode arrays have a spacing corresponding to a width for eight lines on the document surface, and are arranged in the order of R, G, and B, as shown in FIG. 26.

Solid lines A, B, and C indicate ideal paths of light beams from the platen glass 3001 to the CCD line sensor 3006, i.e., paths of light beams that appropriately form images on the R, G, and B photodiode arrays. In case of solid lines A, B, and C, the R-G physical distance (8 lines) and G-B physical distance (8 lines) of the CCD line sensor 3006 match the distance for eight lines on the platen glass 3001.

On the other hand, broken lines α and β indicate an example of paths of light beams from the optical lens 3005 to the CCD line sensor 3006 when the optical lens 3005 suffers eccentricity.

Broken line α indicates the path of a light beam that forms an image on the R photodiode of the CCD line sensor 3006, and an image is formed on the inner side compared to the ideal state indicated by solid line A. This imaging position corresponds to the (7.891)-th line position with reference to the G photodiode, and this means that reflected light at the 8th line position on the surface of the platen glass 3001 forms an image at the (7.891)-th line position on the CCD line sensor 3006. Therefore, a light beam that forms an image at the 8th line position on the CCD line sensor 3006 is reflected light coming from the (8.1105)-th line (=8×8/7.891) on the platen glass 3001.

Likewise, broken line β indicates the path of a light beam that forms an image on the B photodiode, and this light beam forms an image at the (8.047)-th line position with reference to the G photodiode. Therefore, the light beam that forms an image on the B photodiode is reflected light coming from the (7.9533)-th line (=8×8/8.047) on the platen glass surface.

Such positional deviations of light beams that form images on the CCD line sensor 3006 are mainly caused by:

(1) tolerance and deformation upon assembling the lens barrel (2) imaging adjustment error (3) mirror precision Therefore, the deviations of the imaging positions differ among not only models but also individual units. Even in a given individual unit, the deviation changes after an optical unit such as mirrors, lens unit, or the like is exchanged.

FIGS. 27A and 27B show influences of color misregistration (deviations of R, G, and B imaging positions of three colors). In general, image signals scanned by a 3-line color CCD line sensor undergo a line spacing correction process for correcting phase differences among R, G, and B.

In the example shown in FIGS. 27A and 27B, a given line on a document is scanned at time intervals for eight lines in the order of R, G, and B. A line spacing correction circuit delays a G signal for eight lines and an R signal for 16 lines with reference to a B signal which is scanned last, thus adjusting the phases of the three color image signals.

FIG. 27A illustrates an example of an image obtained when three color images are ideally formed. The scanning phase differences in the scan direction are perfectly corrected by the line spacing correction circuit, and the corrected R, G, and B image signals have no phase difference, thus reproducing a clear edge portion of letter "A".

FIG. 27B illustrates an example of an image obtained when color misregistration has occurred. As has been described above with reference to FIG. 26, since the number of lines between R and G on the document is 8.1105, and that between G and B on the document is 7.9533, the distances between neighboring colors are:

R-B: 16.0638 lines

G-B: 7.9533 lines with reference to a B signal.

Therefore, the phase differences after the process of the line spacing correction circuit are:

R-B: 16.0638−16=0.0638 lines

G-B: 7.9533−8=−0.0467 lines

These phase differences blunt the edge portion of letter "A" and generate false colors, as may be apparent from FIG. 27B.

As described above, color misregistration seriously influences especially text reproduction.

In general, digital copying machines and flatbed scanners use various types of light sources. Such light sources include, e.g., a halogen lamp, hot or cold cathode fluorescent lamp using mercury vapor, and the like. The halogen lamp is most prevalently used in digital copying machines, and has merits, i.e., allows adjustments of the light amount and light distribution and has stable light amount, color tincture, and the like. However, the halogen lamp requires large electric power since around 80% of consumed electric power are converted into heat, and is vulnerable to vibrations since light is emitted using a filament.

A flatbed scanner mainly uses a fluorescent lamp since it can assure low power consumption and long service life. In order to use a fluorescent lamp as an alternative light source of a halogen lamp in a digital copying machine with high productivity, an increase in efficiency of the fluorescent lamp has been extensively studied. Furthermore, the use of a fluorescent lamp as an alternative light source of a halogen lamp in a color digital copying machine that must meet a strict image quality requirement is beginning to be noted as a viable option.

There are some types of fluorescent lamps in terms of their structures, and typical ones will be explained below.

A hot cathode fluorescent lamp will be explained first. The hot cathode fluorescent lamp has filaments that emit thermions at the two ends of a fluorescent tube which contains mercury vapor, excites mercury by the emitted thermions, and converts the excited mercury into visible light by a phosphor applied on the inner wall of the tube. In this hot cathode fluorescent lamp, the amount of thermions to be emitted is controlled by a current supplied to the filaments, thus adjusting the light amount.

In a cold cathode fluorescent lamp, a high voltage is applied across electrodes at the two ends of a fluorescent tube to achieve gas separation. In general, a cold cathode fluorescent lamp uses mercury vapor, and is called by such name due to a smaller heat amount than the hot cathode type. Since the cold cathode fluorescent lamp is free from any wear of electrodes, its service life is much longer than the hot cathode type.

An external electrode type rare gas fluorescent lamp is represented by a xenon lamp. In this xenon lamp, xenon gas is sealed inside a tube, xenon atoms are excited by applying a high voltage across counter electrodes arranged outside the fluorescent tube, and the excited electrons are converted into visible light by a phosphor. This xenon lamp has a long service life since it has no expendable parts, but must be applied with a high voltage since it uses xenon gas which is harder to separate than mercury and requires an insulation treatment of the external electrodes. In general, since it is difficult to control a high voltage to be applied, the light amount cannot be adjusted over a broad range.

In this manner, the aforementioned lamps emit light according to the principle in which atoms sealed in the tube are excited and the excited atoms are converted into visible light by a phosphor. Hence, the optical characteristics of these lamps largely depend on the characteristics of the phosphor.

The emission spectral characteristics of a white xenon lamp will be described below with reference to FIGS. 28 and 29. FIG. 28 shows the emission spectral characteristics of a white xenon lamp, and FIG. 29 shows the relationship between the continuous ON time of the white xenon lamp and the output level of a CCD that receives light from the white xenon lamp.

The graph shown in FIG. 28 depicts waveforms obtained by normalizing the initial emission spectral intensity characteristics and emission spectral intensity characteristics for an accumulated ON time of 1,500 hours to overlap each other. In general, a fluorescent tube obtains white by combining a plurality of phosphors, and its emission spectral intensity characteristics have a plurality of peaks, as shown in FIG. 28. These white lamps are generally called 3-wavelength type, and have different characteristics depending on their manufacturers. Most of currently available white fluorescent tubes are of 3-wavelength type. As can be seen from FIG. 28, the characteristics considerably deteriorate in the neighborhood of 400 to 500 nm when the accumulated ON time is 1,500 hours compared to the initial characteristics. Such deterioration is caused by degradation of a phosphor.

Deterioration due to continuous ON operation will be explained below with reference to FIG. 29. In FIG. 29, the abscissa plots the continuous ON time, and the ordinate plots the CCD output. As can be seen from FIG. 29, all the R, G, and B CCD output levels deteriorate with increasing continuous ON time. Also, RGB balance changes. When an ON time of 500 hours has elapsed, RGB balance and CCD output levels stabilize.

However, in an image scanning apparatus such as a scanner that uses a white fluorescent lamp, since the RGB output balance of the CCD changes in correspondence with the accumulated ON time of the white fluorescent lamp, color reproducibility changes over time. As a result, deterioration of image quality such as image quality mismatch between identical models and deterioration of color reproduction occur.

SUMMARY OF THE INVENTION

The present invention has been made in consideration of the above situation, and has as its first object to realize appropriate tone reproduction and color reproduction independent from the models of image sensing apparatuses in an arrangement having an independent image sensing apparatus and image processing apparatus.

It is the second object of the present invention to avoid deterioration of color reproduction due to variations of characteristics of a light source used in an image sensing apparatus along with an elapse of time and to relax image quality mismatch between identical models of image sensing apparatuses.

It is the third object of the present invention to avoid deterioration of color reproduction due to variations of characteristics of a light source along with an elapse of time.

It is the fourth object of the present invention to provide a technique for appropriately correcting spatial positional deviations of a plurality of colors (e.g., R, G, and B) of pixel signals by an external apparatus (e.g., an image processing apparatus connected via a communication line) independently of models or individual characteristics of image sensing apparatuses.

According to the present invention, the foregoing object is attained by providing an image sensing system constituted by connecting an image sensing apparatus and image processing apparatus, the image sensing apparatus comprising: a storage medium for holding data on image sensing characteristic; and an output unit for outputting the data on image sensing characteristic held in the storage medium to the image processing apparatus, and the image processing apparatus comprising: an input unit for receiving the data on image sensing characteristic output from the image sensing apparatus; a generation unit for generating image sensing characteristic correction data on the basis of the data on image sensing characteristic received by the input unit; and an image sensing characteristic correction unit for correcting an image sensing characteristic of image data received from the image sensing apparatus using the image sensing characteristic correction data generated by the generation unit.

According to the present invention, the foregoing object is attained by providing an image sensing apparatus which can be used upon being connected to an external image processing apparatus, comprising: a storage medium for holding data on image sensing characteristic; and an output unit for outputting the data on image sensing characteristic held in the storage medium to the external image processing apparatus.

Further, the foregoing object is also attained by providing an image processing apparatus which can be used upon being connected to an external image sensing apparatus, comprising: an input unit for receiving the data on image sensing characteristic output from the external image sensing apparatus; and an image sensing characteristic correction unit for correcting an image sensing characteristic of image data received from the external image sensing apparatus on the basis of the data on image sensing characteristic received by the input unit.

Furthermore, the foregoing object is also attained by providing an image correction method in an image sensing system constituted by connecting an image sensing apparatus and image processing apparatus, comprising: the correction step of correcting an image sensing characteristic of image data received from the image sensing apparatus on the basis of the data on image sensing characteristic of the image sensing apparatus.

Further, the foregoing object is also attained by providing an image scanning system which comprises an image scanning apparatus, an image processing apparatus, and a connection unit that connects the image scanning apparatus and the image processing apparatus to be able to communicate with each other, the image scanning apparatus comprising: a light source which can illuminate a document and a reference member serving as a color reference; an image scanning unit for scanning an image on the document and the reference member illuminated by the light source; and a controller for controlling, at a system-startup timing, to illuminate the reference member by the light source, scan the illuminated reference member by the image scanning unit, and transfer information corresponding to a value obtained by scanning the reference member to the image processing apparatus via the connection unit, and the image processing apparatus comprising: a color correction unit for executing a color correction process of an image scanned by the image scanning apparatus using the information transferred from the image scanning apparatus.

Further, the foregoing object is also attained by providing an image scanning apparatus which can be connected to an external image processing apparatus via a connection unit, comprising: a light source which can illuminate a document and a reference member serving as a color reference; an image scanning unit for scanning an image on the document and the reference member illuminated by the light source; and a controller for controlling, at an apparatus startup timing, to illuminate the reference member by the light source, scan the illuminated reference member by the image scanning unit, and transfer information corresponding to a value obtained by scanning the reference member to the external image processing apparatus via the connection unit Further, the foregoing object is also attained by providing an image processing apparatus which can be connected to an external image scanning apparatus via a connection unit, comprising: a color correction unit for executing a color correction process of an image scanned by the external image scanning apparatus using information transferred therefrom.

Further, the foregoing object is also attained by providing a color correction method for executing, in a system which comprises a light source which can illuminate a document and a reference member serving as a color reference, and scans an image on the document and the reference member illuminated by the light source, a color correction process of the scanned image using a color correction coefficient, comprising: a step of illuminating the reference member by the light source, and scanning the illuminated reference member at a startup timing of the system; and a step of changing the color correction coefficient in accordance with a value obtained by scanning the reference member.

Further, the foregoing object is also attained by providing a method of controlling an image scanning apparatus which can be connected to an external image processing apparatus via a connection unit, comprises a light source that can illuminate a document and a reference member serving as a color reference, and scans an image on the document and the reference member illuminated by the light source, comprising: the step of illuminating the reference member by the light source, and scanning the illuminated reference member at a startup timing of the apparatus; the step of changing a color correction coefficient in accordance with a value obtained by scanning the reference member; and the step of transferring information corresponding to the value obtained by scanning the reference member to the external image processing apparatus.

Further, the foregoing object is also attained by providing a color correction method in an image processing apparatus which can be connected to an external image scanning apparatus via a connection unit, comprising: the step of receiving information from the external image scanning apparatus; the step of receiving a scanned image from the external image scanning apparatus; and the step of executing a color correction process of the image using the information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing numerical value data that represent the linearity characteristics shown in FIG. 2;

FIG. 26 shows the paths of light beams that form images on a CCD line sensor;

FIGS. 27A and 27B are views for explaining image quality drop due to color misregistration;

FIG. 29 is a graph showing the relationship between the continuous ON time of the white xenon lamp and the output level of the CCD that receives light coming from the white xenon lamp.

DETAILED DESCRIPTION OF THE PREFERRED EMBODIMENTS

Preferred embodiments of the present invention will be described in detail in accordance with the accompanying drawings.

First Embodiment

Figure 1:
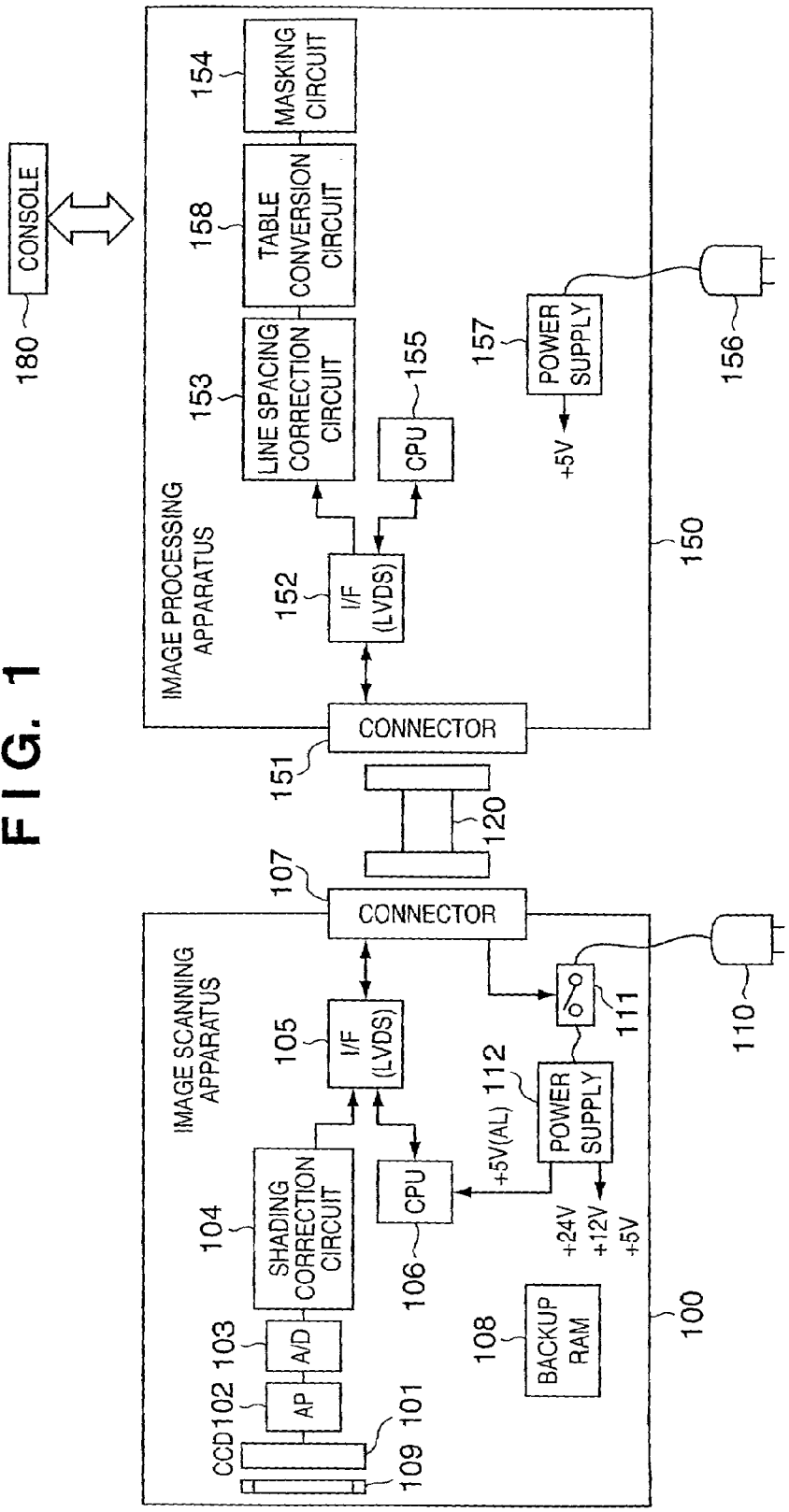
FIG. 1 is a block diagram showing the arrangement of an image scanning system according to the first embodiment of the present invention.

FIG. 1 is a block diagram showing the arrangement of an image scanning system according to the first embodiment of the present invention.

Referring to FIG. 1, reference numeral 100 denotes an image scanning apparatus; and 150, an image processing apparatus for processing document image data scanned by the image scanning apparatus. The image scanning apparatus 100 and image processing apparatus 150 are separated from each other, and are connected via a cable 120. The image processing apparatus 150 has a printer and controller (neither is shown), and the controller has a network connection function and PDL data rasterizing function.

Reference numeral 180 denotes a console which is connected to the image processing apparatus 150. The console 180 has operation keys for giving instructions to the image scanning apparatus 100 and image processing apparatus 150, a display panel for displaying the operation contents, status of the individual apparatuses, and the like, and so forth. An image scan instruction to the image scanning apparatus 100 is issued at the console 180, and is sent to the image scanning apparatus 100 via the image processing apparatus 150.

The image scanning apparatus 100 includes a document illumination lamp 109, CCD line sensor 101, analog processor (AP) 102, A/D converter 103, shading correction circuit 104, first interface 105, first CPU 106, first connector 107, backup RAM 108, first alternating current (AC) plug 110, AC relay switch 111, and first direct current (DC) power supply 112.

The document illumination lamp 109 uses a white xenon tube. The CCD line sensor 101 comprises three, i.e., R, G, and B photodiode arrays, and scans light reflected by a document illuminated by the document illumination lamp as R, G, and B color-separated signals and converts them into electrical signals.

The analog processor 102 is generally prepared as an ASIC, and adjusts the output from the CCD line sensor 101 to a predetermined level via correlative double sampling, a gain adjustment amplifier, and the like. The A/D converter 103 converts the signal adjusted by the analog processor 102 into digital data. The shading correction circuit 104 compensates sensitivity variations of the CCD line sensor 101 in units of pixels with reference to scanned data of a reference white plate (not shown). The compensated image data is input to the first interface 105.

The first interface 105 adopts a Low Voltage Differential Signal (LVDS) specification, and comprises a driver for converting and driving image data processed by the shading correction circuit 104 into a low voltage differential signal, and a receiver for converting the input low voltage differential signal into a single line signal.

The first CPU 106 controls the image scanning apparatus 100, and makes sequence control of an optical motor (not shown), control of a document feeder (DF; not shown), control of the analog processor 102 and shading correction circuit 104, and communication control with the image processing apparatus 150 done via the first LVDS interface 105.

The first connector 107 receives the cable 120. A video signal and control signal converted into low voltage differential signals by the first interface 105 are output onto the cable 120 via the connector 107, and a control signal and the like output from the image processing apparatus 150 onto the cable 120 are input to the LVDS interface 105 via the connector 107.

The backup RAM 108 is controlled by the first CPU 106, and comprises an EEPROM or an SRAM with a backup battery. The backup RAM 108 saves adjustment values and characteristic values in the image scanning apparatus 100, and stores linearity characteristic data of the image scanning apparatus 100. The linearity characteristic data are 256-byte data per color (each of red (R), green (G), and blue (B)), and amount to 768 bytes.

Figure 2:
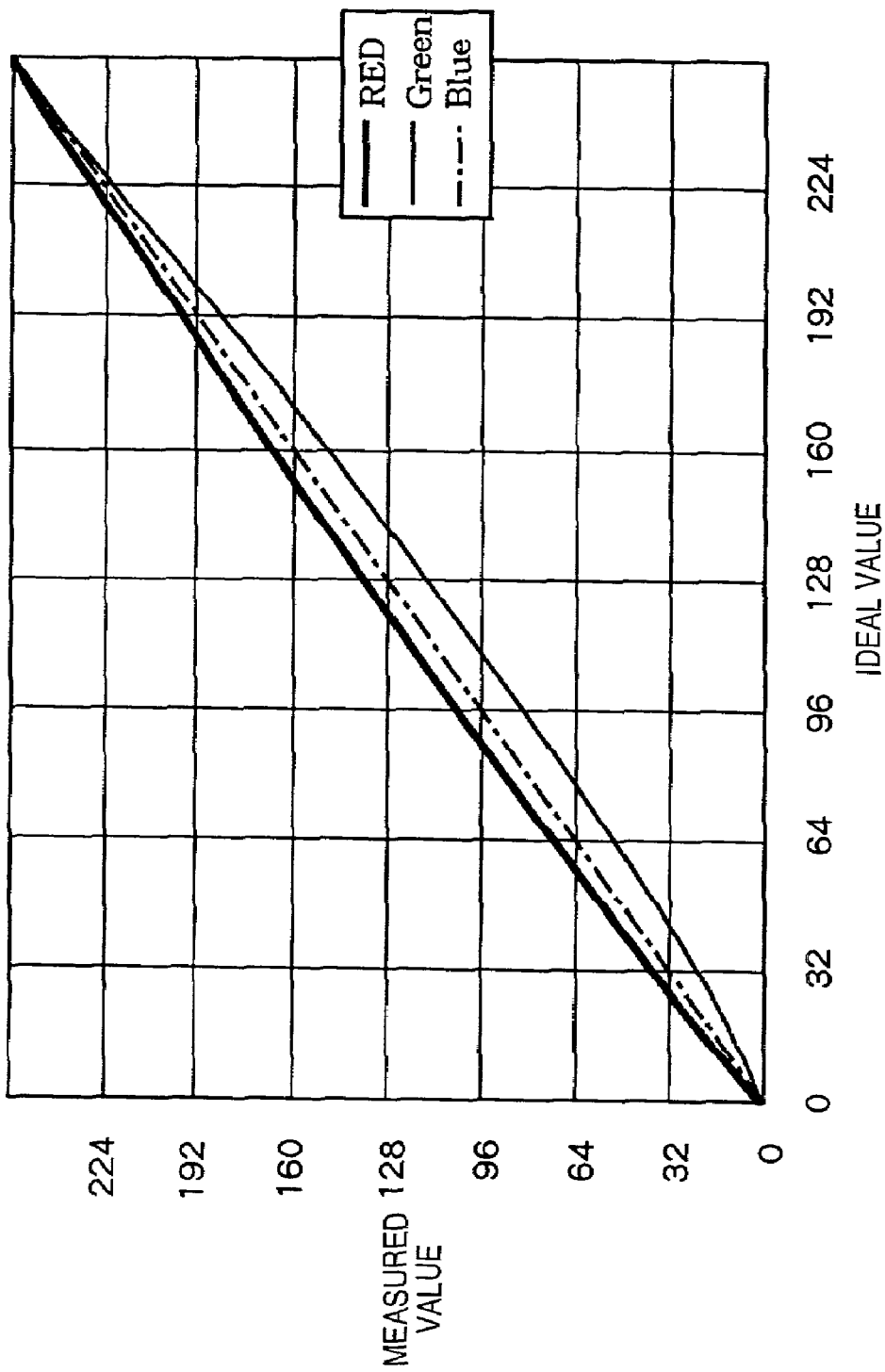
FIG. 2 is a graph showing an example of linearity characteristics of an image scanning apparatus according to an embodiment of the present invention.

FIG. 2 is a graph showing an example of the linearity characteristics of the image scanning apparatus 100 held in the backup RAM 108. The abscissa plots an ideal value, and the ordinate plots an actual value. FIG. 2 shows linearity characteristics in units of R, G, and B, and R, B, and B linearity characteristics are different from each other, as can be seen from the graph. FIG. 3 shows a numerical data table of these characteristics.

The first AC plug 110 supplies a commercial power supply to the image scanning apparatus 100. The AC relay switch 111 controls to ON/OFF of the AC power supply supplied via the first AC plug 110. The operation of the switch 111 is controlled by a control signal sent from the image processing apparatus 150 via the cable 120 and connector 107.

The first DC power supply 112 receives the AC power supply via the AC relay switch 111, and supplies four different DC electric powers of +24 V, +12 V, +5 V, and +5 V (always supplied) to the respective units of the image scanning apparatus 100.

The four different electric powers are respectively supplied to the following blocks.

+24 V: the document illumination lamp 109, and an optical motor and document feeder (neither is shown)

+12 V: the CCD line sensor 101

+5 V: the analog processor 102, A/D converter 103, shading correction circuit 104, first interface 105, and backup RAM 108

+5 V (AL): the first CPU 106

The +5 V (AL) electric power is kept supplied as long as the AC power supply is supplied to the first DC power supply 112, and is supplied all the time The remaining three electric powers (+24 V, +12 V, +5 V) are controlled to be turned on/off by the first CPU 106. Also, supplies of the power supply voltages other than +5 V (AL) to the corresponding blocks are controlled by the CPU 106.

The image processing apparatus 150 includes a second connector 151, second interface 152, line spacing correction circuit 153, table conversion circuit 158, masking circuit 154 for making color space correction, second CPU 155, second AC plug 156, and second DC power supply 157.

The second connector 151 receives the cable 120, and is used to receive an image signal output from the image scanning apparatus 100 and to exchange control signals such as a communication control signal and the like with the first CPU 106 of the image scanning apparatus 100.

The second interface 152 adopts an LVDS specification as in the first interface 105, and comprises a driver and receiver for low voltage differential signals exchanged via the cable 120.

The LVDS interface 152 outputs a video signal received from the image scanning apparatus 100 to the line spacing correction circuit 153. The line spacing correction circuit 153 corrects deviations of document scan timings produced by the physical distances between neighboring photodiode arrays of the CCD line sensor 101, and normally comprises a FIFO memory corresponding to a plurality of lines, and a timing circuit for controlling a write and read with respect to the FIFO memory.

The table conversion circuit 158 performs linearity correction by table conversion, and comprises 256-byte memories for RED, GREEN, and BLUE colors. The contents of the conversion tables are computed from linearity characteristic data-as the characteristic values of the image scanning apparatus 100. Computations are made by the second CPU 155.

The masking circuit 154 corrects R, G, and B signals by 3×3 matrix arithmetic operations to correct a unique color space of the image scanning apparatus 100 to a standard one, and arithmetic formulas are:

$$Rw=A11{\times}R+A12{\times}G+A13{\times}B$$

$$Gw=A21{\times}R+A22{\times}G+A23{\times}B$$

$$Bw=A31{\times}R+A32{\times}G+A33{\times}B$$

where R, G, and B are R, G, and B signals output from the line spacing correction circuit 153, Rw, Gw, and Bw are signals after masking correction, and Axy (x, y: 1 to 3) are 3×3 matrix coefficients, which are given as unique characteristic values of the image scanning apparatus 100.

As another example, R, G, and B signal levels may be directly converted by looking up lookup tables.

The second CPU 155 controls the entire image processing apparatus 150, and makes communication control with the first CPU 106 and that with the console 180.

The second AC plug 156 supplies a commercial power supply to the image processing apparatus 150. The second DC power supply 157 receives an AC power supply via the second AC plug 156, and supplies a DC power supply of +5 V to the image processing apparatus 150.

Figure 4:
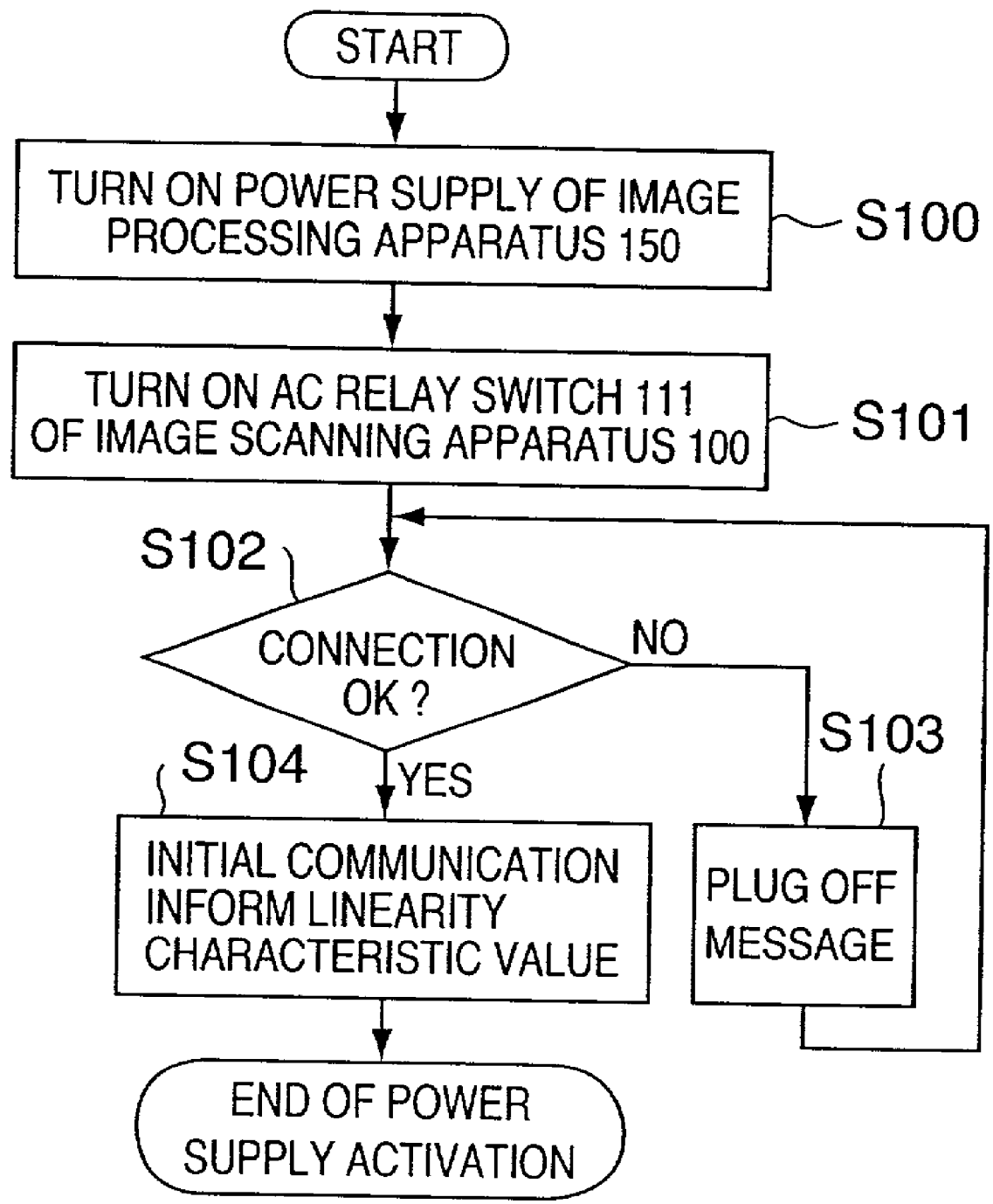
FIG. 4 is a flow chart showing an operation upon power ON of the image scanning system according to the first embodiment of the present invention.

The operation of the image scanning system upon power ON will be explained below with reference to the flow chart shown in FIG. 4.

In step S100, the power supply of the image processing apparatus 150 is turned on to begin to activate the system.

In step S101, the AC relay switch 111 of the image scanning apparatus 100 is turned on under the control of the second CPU 155 of the image processing apparatus 150 to turn on the power supply of the image scanning apparatus 100.

In step S102, the second CPU 155 communicates with the first CPU 106 to check if connection is normal. If YES in step S102, the flow advances to step S104; otherwise, the flow advances to step S103.

In step S103, since the AC plug 110 may be left unplugged from the commercial power supply, a "plug OFF" message is displayed on the console 180 to prompt the user to check the plug, and the flow returns to step S102.

If the connection is normal, an initial communication is made between the image scanning apparatus 100 and image processing apparatus 150. The linearity characteristic data saved in the backup RAM 108 are transferred from the image scanning apparatus 100 to the image processing apparatus 150 in this step S104. Note that the communication format in this step is not particularly limited.

Upon completion of the aforementioned processes, the startup process of the image scanning system is complete.

In the image processing apparatus 150, the second CPU 155 inversely converts the linearity characteristic data transferred from the image scanning apparatus 100, and sets obtained data in the table conversion circuit 158.

Figure 5:
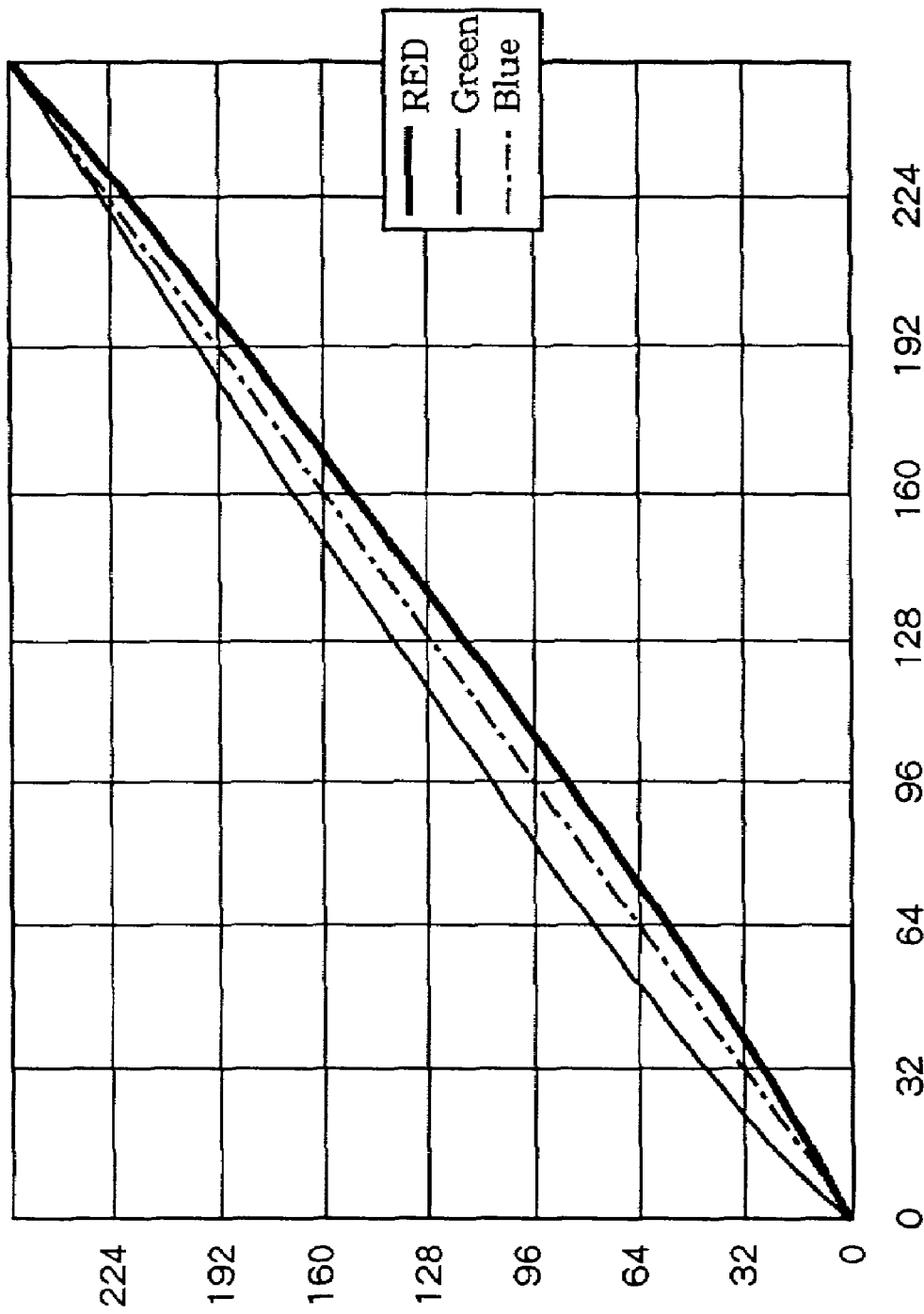
FIG. 5 is a graph showing an example of correction table characteristics according to the first embodiment of the present invention.

FIG. 5 is a graph showing the characteristics of linearity correction tables set in the table conversion circuit 158.

When the table conversion circuit 158 makes linearity correction based on those tables, the linearity characteristics of the R, G, and B outputs can be corrected.

Figure 6:
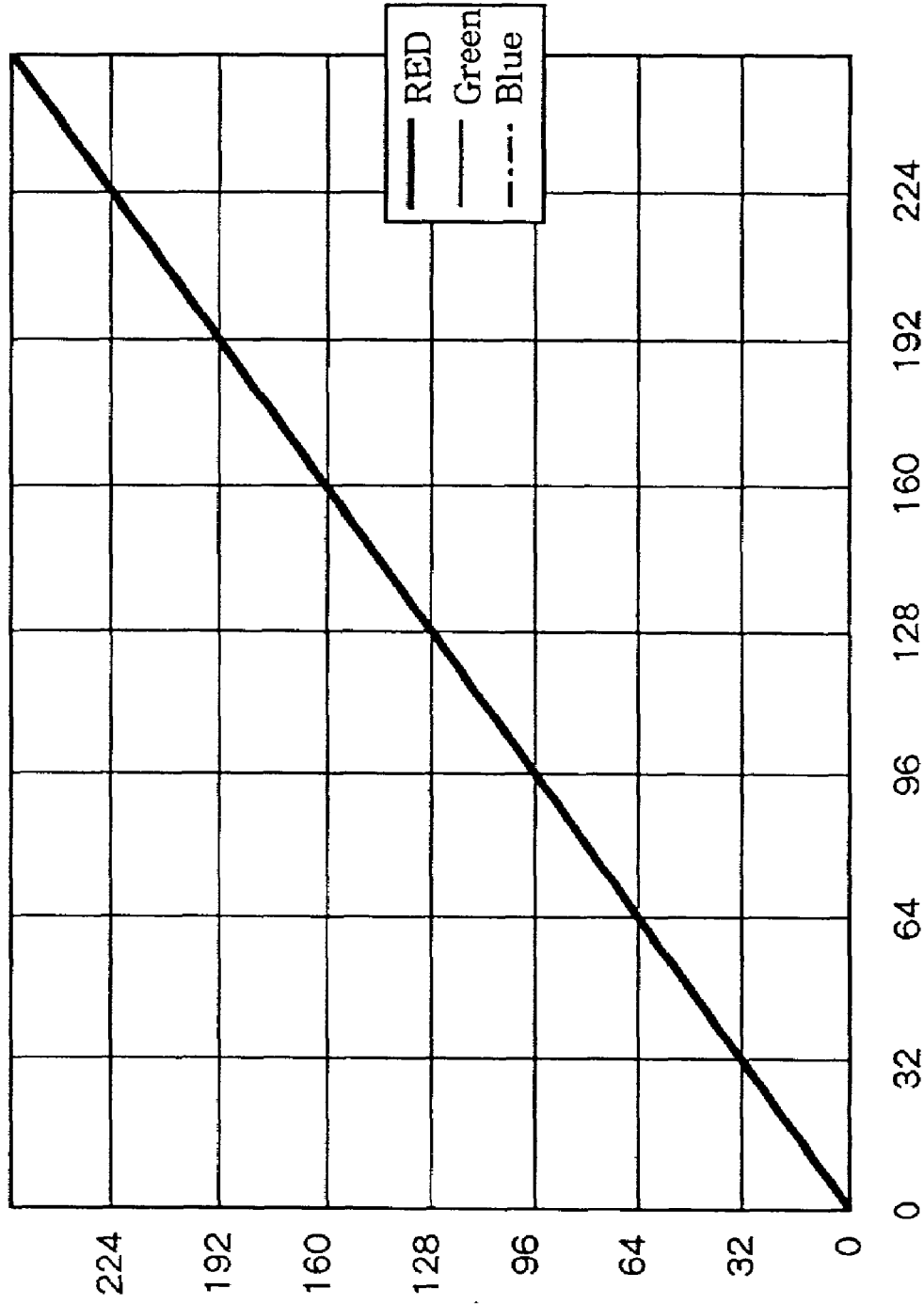
FIG. 6 is a graph showing an example of characteristics after linearity correction according to the first embodiment of the present invention.

FIG. 6 is a graph showing the characteristics after linearity correction. As can be seen from FIG. 6, R, G, and B outputs are corrected to have identical linearity characteristics by linearity correction in the table conversion circuit 158.

The correction table computation method in the image processing apparatus 150 is merely an example, and the present invention is not limited to such specific method. The linearity characteristic data transferred from the image scanning apparatus 100 to the image processing apparatus 150 described in the first embodiment are an example, and may be appropriately set depending on the quantization size and the size of the backup RAM 108.

For example, if the quantization size is 10 bits, the characteristic data may have a size of $2^{10} \times 3$ colors=3,072 words (30,720 bits).

Also, the linearity characteristic data may be discontinuous data. The discontinuous data indicate, e.g., scan levels obtained by scanning a 10-density level chart, and express the linearity characteristics stepwise.

If the size of the backup RAM 108 is to be reduced, a value γ that indicates linearity characteristics may be used as a unique characteristic value. Note that the γ coefficient satisfies Vout=K×Vinγ between an input Vin and output Vout (K=constant).

In the first embodiment, the backup RAM 108 stores the linearity characteristic data of the image scanning apparatus 100, and the image processing apparatus 150 computes linearity correction tables based on the linearity characteristics. However, the present invention is not limited to such specific arrangement. For example, the backup RAM 108 may pre-store linearity correction data, and the stored data may be transferred to the image processing apparatus 150.

With the aforementioned operation, appropriate tone reproduction and color reproduction independent from models can be realized in a system having the individual image scanning apparatus and image processing apparatus.

As described above, according to the first embodiment of the present invention, appropriate tone reproduction and color reproduction independent from models can be attained in a system having the individual image scanning apparatus and image processing apparatus.

In the first embodiment, linearity characteristic correction has been exemplified. However, as is apparent to those who are skilled in the art, various scan characteristics unique to each image scanning apparatus can be corrected by the same method.

In the first embodiment, the scanner has been exemplified as an image sensing apparatus. However, the present invention is not limited to such specific apparatus, and can be applied to various other image sensing apparatuses such as a digital camera, digital video, and the like.

Second Embodiment

Figure 7:
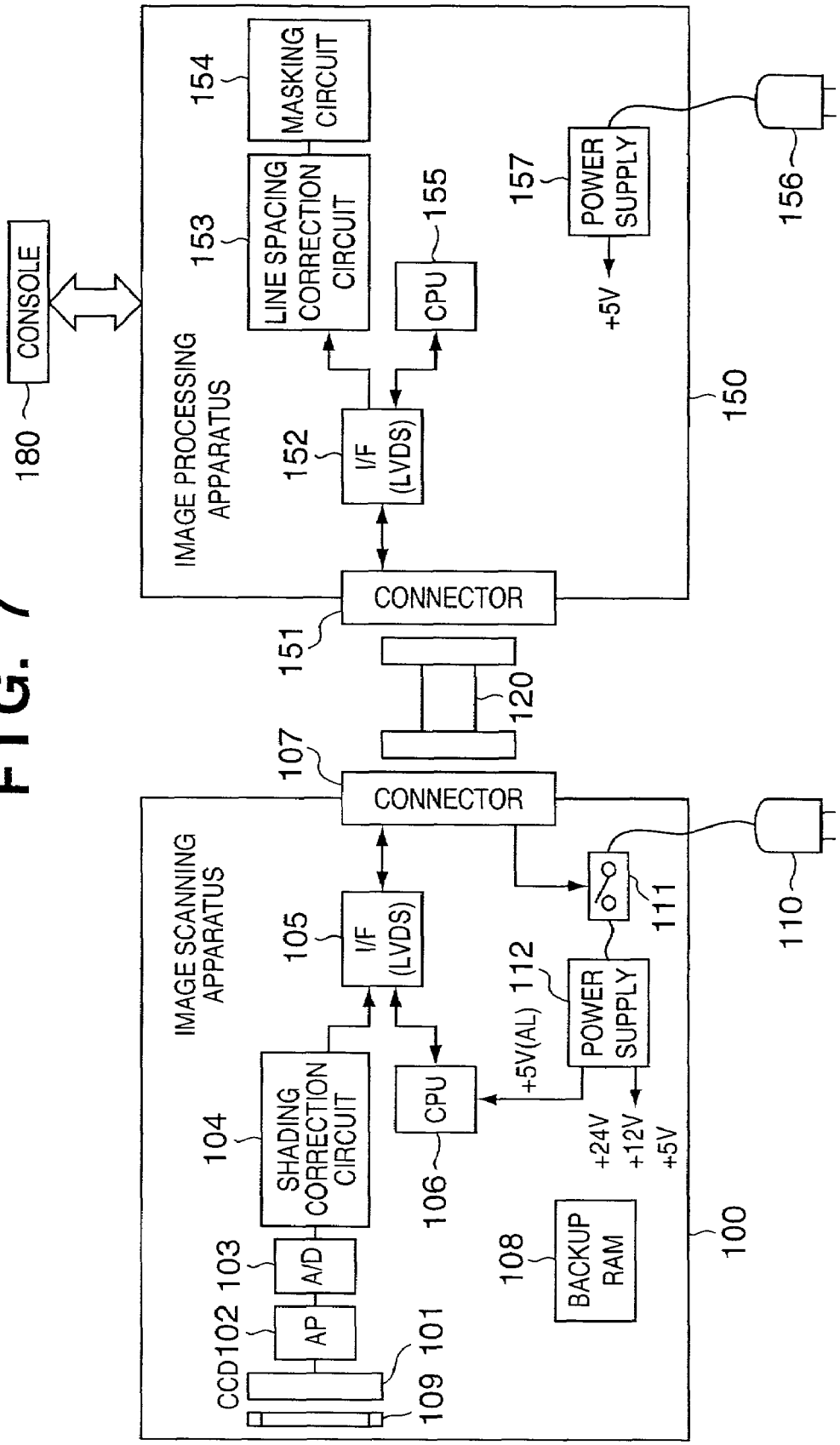
FIG. 7 is a block diagram showing the arrangement of an image scanning system according to the second embodiment of the present invention.

FIG. 7 is a block diagram showing the arrangement of an image scanning system according to the second embodiment of the present invention.

Differences between the image scanning system of the second embodiment shown in FIG. 7 and the arrangement shown in FIG. 1 are that the need for the table conversion circuit 158 can be obviated, and the first CPU 106 can control the power supply 112. Since other arrangements are the same as those described in the first embodiment with reference to FIG. 1, a detailed description thereof will be omitted. In the second embodiment, the backup RAM 108 stores four color correction coefficients corresponding to characteristic variations (variations of emission spectral characteristics) of the document illumination lamp 109, and these values are updated as needed. Also, the RAM 108 stores status data of the document illumination lamp 109 as needed. Note that the status data of the document illumination lamp 109 is a maximum value of the signal output level obtained by illuminating a reference white plate with the document illumination lamp 109 and scanning the illuminated reference white plate by the CCD 101, and is managed in units of R, G, and B.

Figure 8:
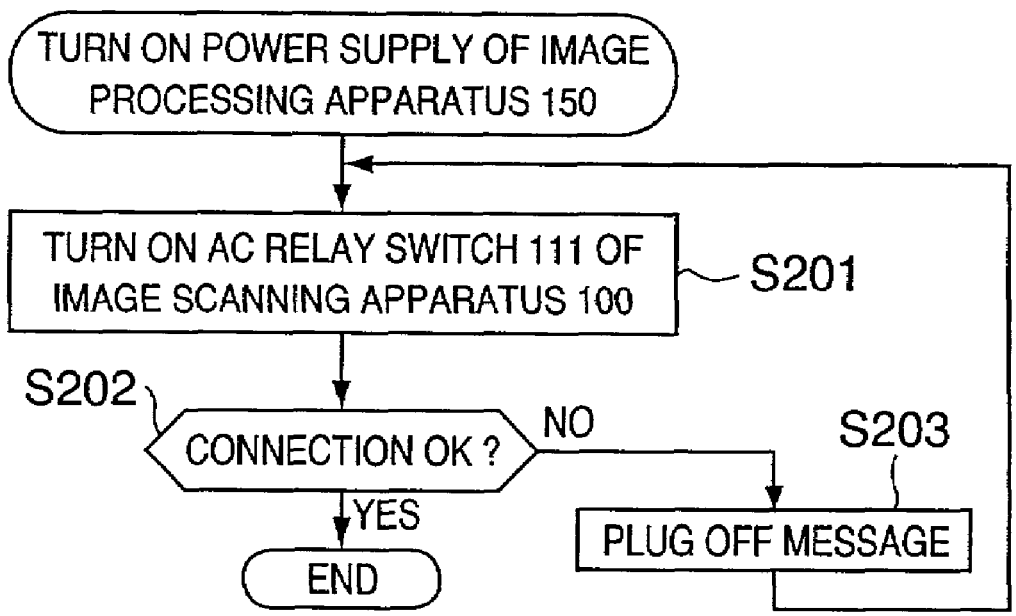
FIG. 8 is a flow chart showing the operation executed until an image processing apparatus starts up an image scanning apparatus upon power ON according to the second embodiment of the present invention.
Figure 9:
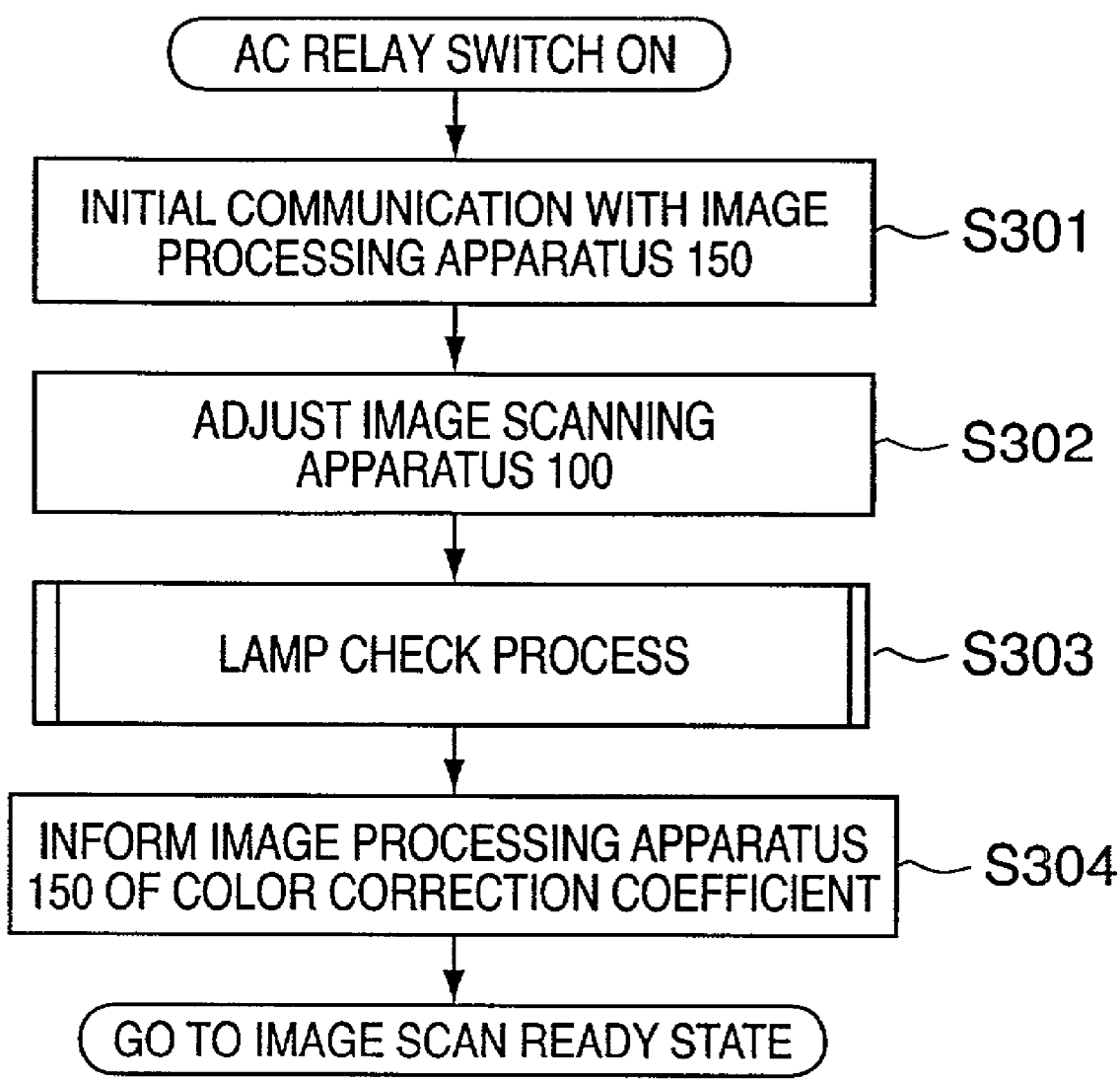
FIG. 9 is a flow chart showing the operation executed until the image scanning apparatus goes to an image scan ready state after power ON according to the second embodiment of the present invention.
Figure 10:
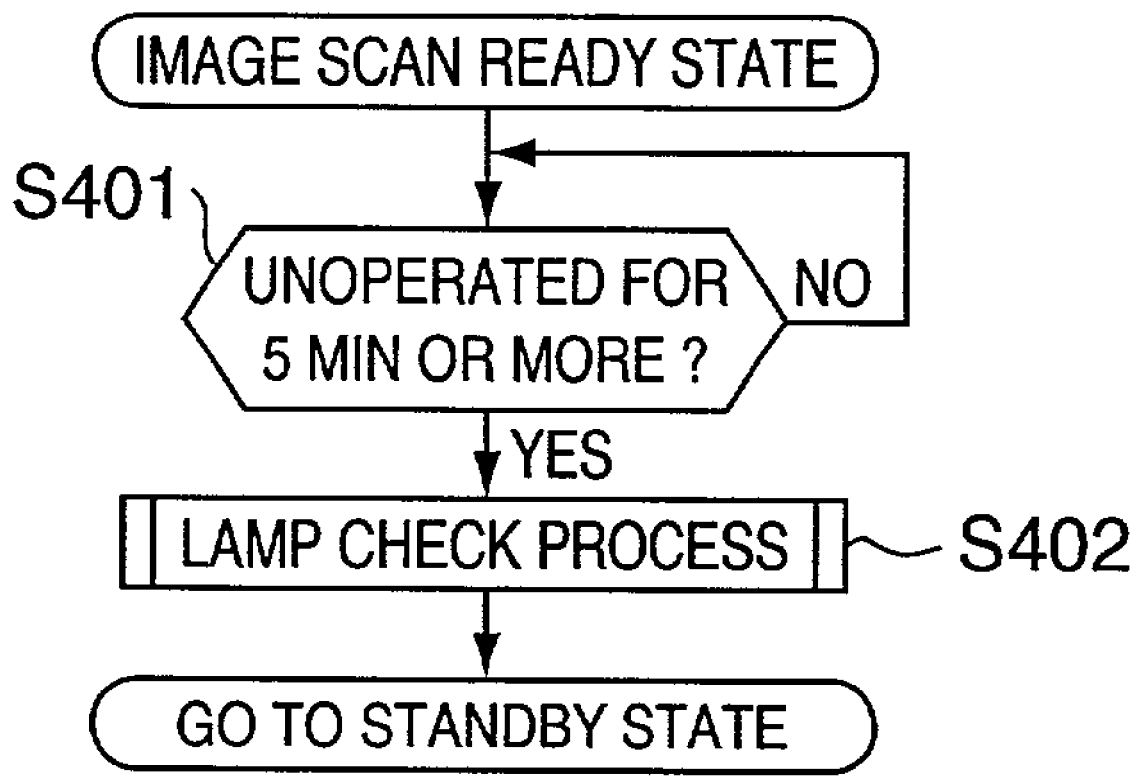
FIG. 10 is a flow chart showing the operation executed when the image scanning apparatus goes from the image scan ready state to a standby state according to the second embodiment of the present invention.
Figure 11:
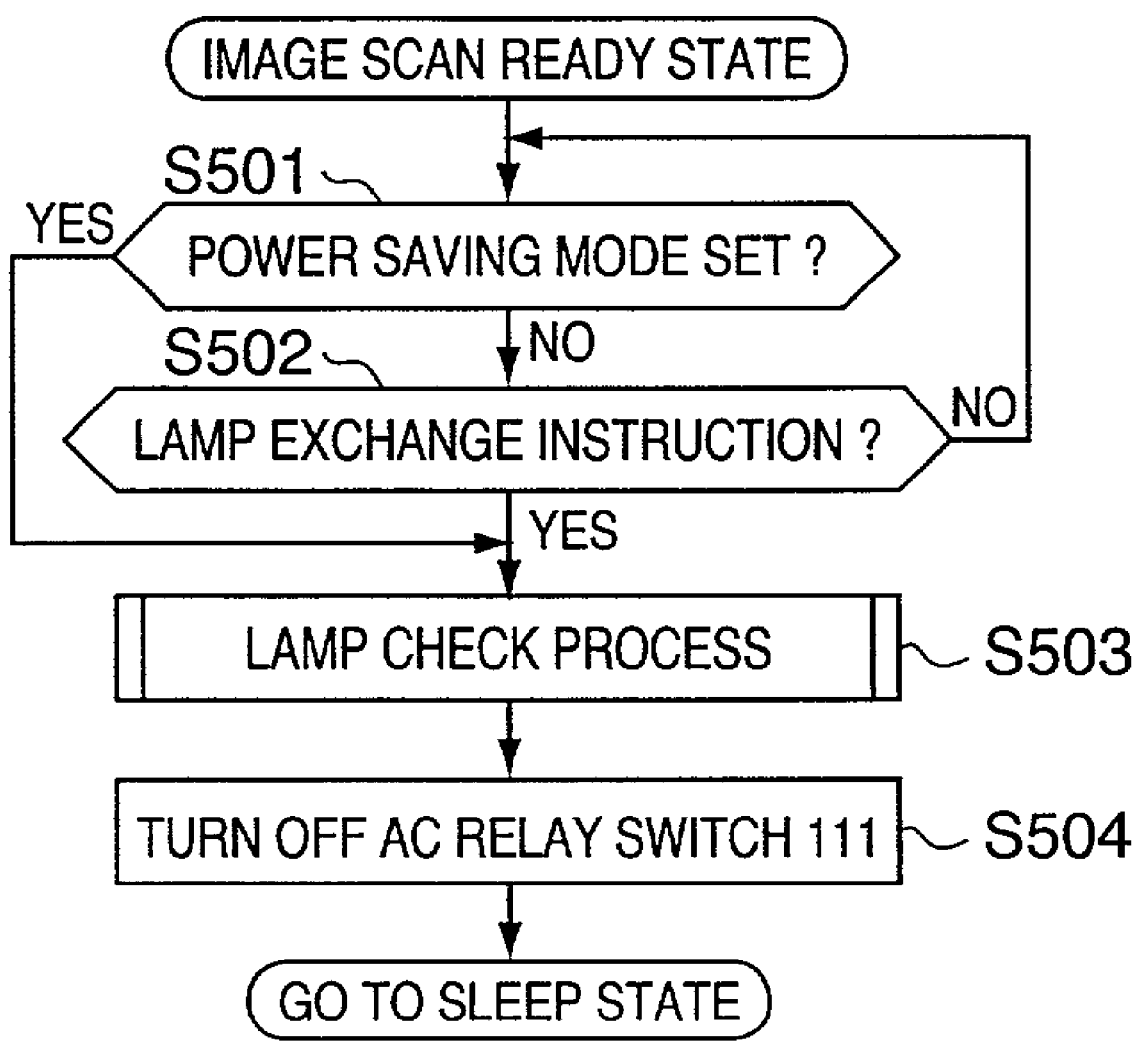
FIG. 11 is a flow chart showing the operation executed when the image scanning apparatus goes from the image scan ready state to a sleep state according to the second embodiment of the present invention.
Figure 12:
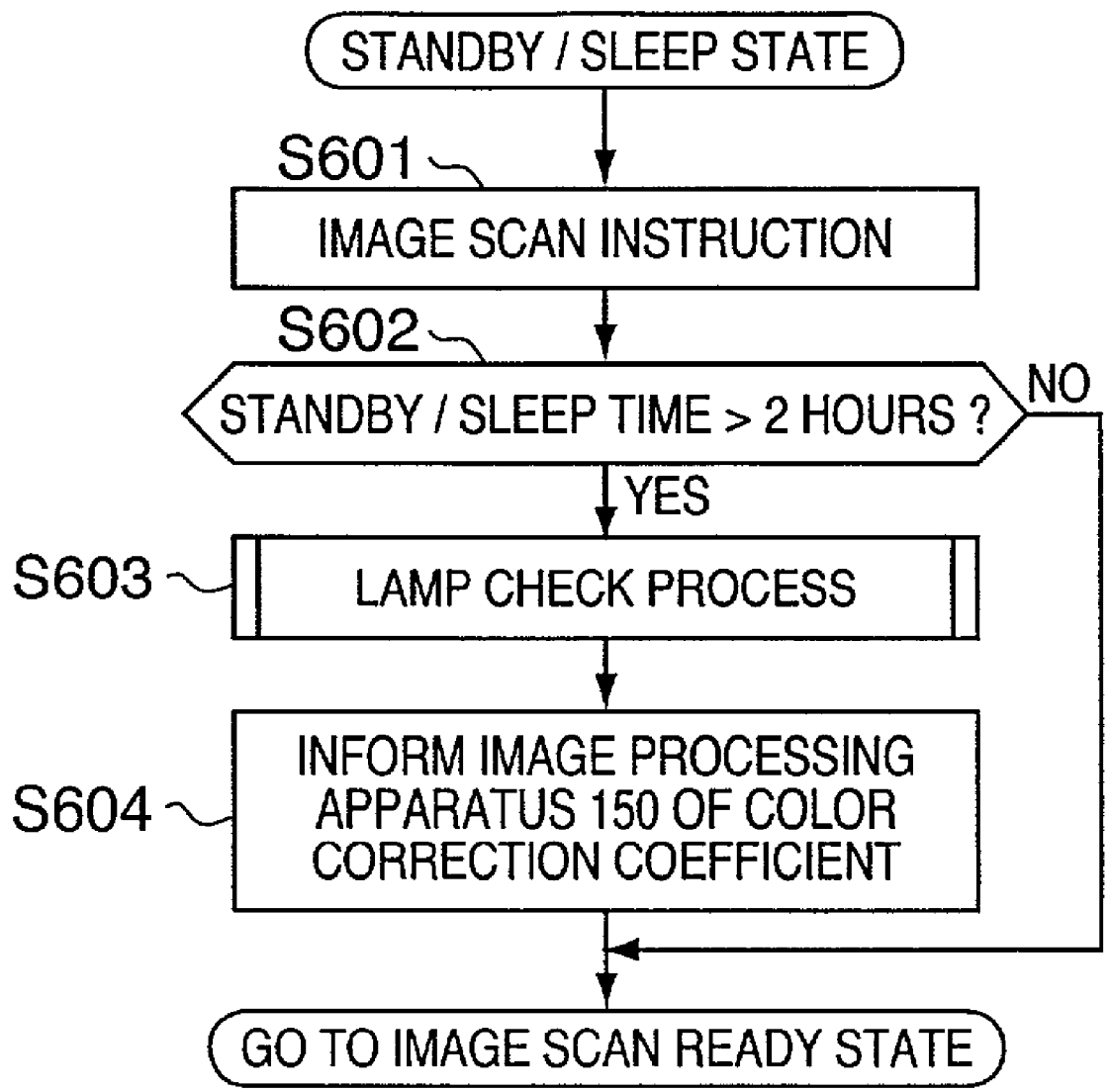
FIG. 12 is a flow chart showing the operation executed when the image scanning apparatus returns from the standby or sleep state to the image scan ready state according to the second embodiment of the present invention.
Figure 13:
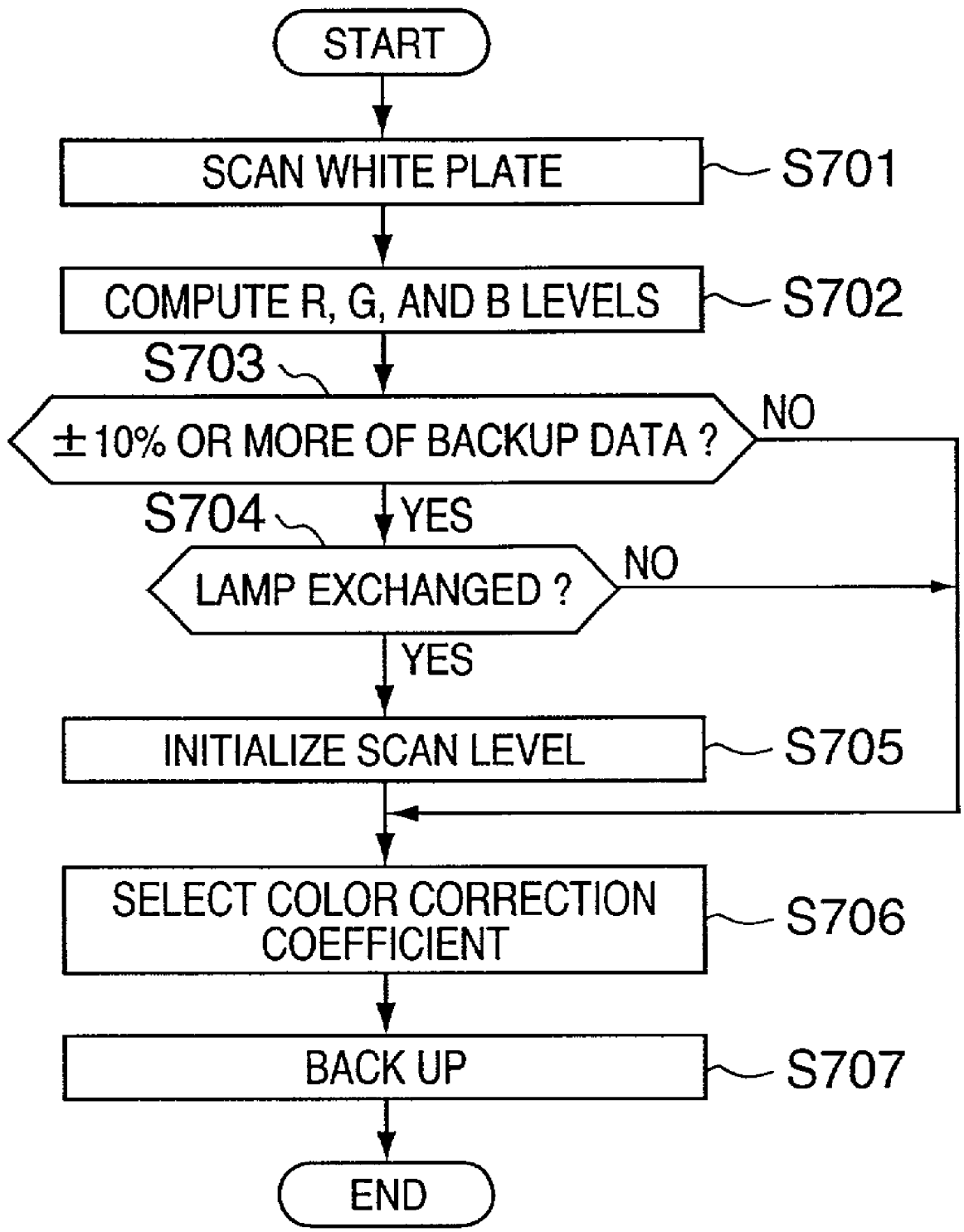
FIG. 13 is a flow chart showing the output level confirmation operation of a document illumination lamp in the image scanning apparatus according to the second embodiment of the present invention.

The operations of the image scanning system of the second embodiment will be explained below with reference to FIGS. 8 to 13. FIG. 8 is a flow chart showing the operation executed until the image processing apparatus starts up the image scanning apparatus upon power ON in the second embodiment, FIG. 9 is a flow chart showing the operation executed until the image scanning apparatus goes to an image scan ready state after power ON, FIG. 10 is a flow chart showing the operation executed when the image scanning apparatus goes from the image scan ready state to a standby state, FIG. 11 is a flow chart showing the operation executed when the image scanning apparatus goes from the image scan ready state to a sleep state, FIG. 12 is a flow chart showing the operation executed when the image scanning apparatus restores from the standby or sleep state to the image scan ready state, and FIG. 13 is a flow chart showing the output level confirmation operation of the document illumination lamp in the image scanning apparatus.

The operation executed until the image processing apparatus starts up the image scanning apparatus upon power ON will be explained first with reference to FIG. 8. The control that pertains to this operation is done by the second CPU 155. When the power supply of the image processing apparatus 150 is turned on, a control signal for activating the AC relay switch 111 of the image scanning apparatus 100 is output to the image scanning apparatus 100 in step S201 so as to start up the image scanning apparatus 100. In response to this control signal, the AC relay switch 111 is turned on, and an AC power supply is supplied to the first DC power supply 112. In this fashion, the first DC power supply 112 is activated, and a detection means (not shown) that detects this activation outputs a High-level connection detection signal to the image processing apparatus 150 via the cable 120.

The flow then advances to step S202 to receive the connection detection signal output from the image scanning apparatus 100, and the level of this connection detection signal is checked. If the connection detection signal is at High level, it is determined that the AC relay switch 111 operates normally (turned on), and activation of the power supply 112 is complete. This processing then ends.

By contrast, if the connection detection signal is not at High level, it is determined that a connection error has occurred. An OFF control signal is output to the AC relay switch 111, and the flow then advances to step S203. In step S203, the display panel of the console 180 is controlled to display a message that prompts the user to check if the AC plug 110 is plugged. Since this embodiment assumes that a connection error often occurs as the power supply 112 is not activated due to the AC plug 110 which remains unplugged even though the AC relay switch 111 is turned on, the aforementioned message is displayed in step S203. The flow then returns to step S202, and steps S201 to S203 are repeated until it is determined in step S202 that the connection detection signal changes to High level, i.e., activation of the power supply 112 is complete.

The operation executed until the image scanning apparatus 100 goes to an image scan ready state after power ON will be described below with reference to FIG. 9. The control that pertains to this operation is done by the first CPU 106.

In the image scanning apparatus 100, when the AC relay switch 111 is turned on and the first DC power supply 112 is activated, an initial communication with the image processing apparatus 150 is made in step S301 (FIG. 9) to inform the image processing apparatus 150 of the characteristics (parameters) of the image scanning apparatus 100. Since not only a sole image scanning apparatus 100 but also image scanning apparatuses having different characteristics are likely to be connected to the image processing apparatus 150, the image processing apparatus 150 must recognize the characteristics of each image scanning apparatus 100

The flow then advances to step S302 to adjust a video processing system. More specifically, offset adjustment for adjusting the black level obtained when the document illumination lamp 109 is kept OFF to a predetermined level, and gain adjustment for scanning a white reference plate illuminated by the document illumination lamp 109, and adjusting the white level obtained by this scan to a predetermined level are repeated. The flow advances to step S303 to check the lamp. More specifically, status data of the document illumination lamp 109 is acquired, and a color correction coefficient is selected based on the acquired data. Details of the contents of this process will be described later using FIG. 13.

In step S304, the selected color correction coefficient is sent to the image processing apparatus 150 (CPU 155). The CPU 155 of the image processing apparatus 150 sets the masking circuit 154 on the basis of the received color correction coefficient. After the color correction coefficient is sent, the activation operation ends, and the image scanning apparatus 100 goes to an image scan ready state. In the image scan ready state, the image scanning apparatus 100 is ready to start an image scan in response to an image scan instruction from the console 180.

The operation executed when the image scanning apparatus 100 goes from the image scan ready state to a standby state will be explained below with reference to FIG. 10. In the standby state, the CPU 106 controls to stop supplies of three voltages +24 V, +12 V, and +5 V from the power supply 112.

When the image scanning apparatus 100 goes to the image scan ready state, it is monitored in step S401 if the apparatus has stayed unoperated for 5 minutes or more. If YES in step S401, the flow advances to step S402 to check the document illumination lamp 109. This lamp check process is the same as that in step S303, and will be described in detail later with reference to FIG. 13. Then, the apparatus goes to the standby state in which the CPU 106 controls to stop supplies of three voltages +24 V, +12 V, and +5 V from the power supply 112.

The operation executed when the image scanning apparatus 100 goes from the image scan ready state to a sleep state will be described below with reference to FIG. 11. In the sleep state, the AC relay switch 111 of the image scanning apparatus 100 is turned off by the CPU 155 of the image processing apparatus 150.

When the image scanning apparatus 100 goes to the image scan ready state, it is checked in step S501 if an energy saving mode is set. The energy saving mode is one for the entire system, and is set at the console 180. If the energy saving mode is set, the flow jumps to step S503; otherwise, the flow advances to step S502. It is checked in step S502 if lamp exchange is instructed. If NO in step S502, the flow returns to step S501 to hold the image scan ready state. If YES in step S502, the flow advances to step S503.

In step S503, the same lamp check process as in step S303 in FIG. 9 is executed. In step S504, the AC relay switch 111 is turned off in response to a control signal from the image processing apparatus 150, and the apparatus then goes to the sleep state.

The operation executed when the image scanning apparatus 100 restores from the standby or sleep state to the image scan ready state will be described below with reference to FIG. 12.

Upon receiving an image scan instruction from the console 180 in the standby or sleep state of the image scanning apparatus 100 in step S601, the flow advances to step S602 to check if the standby or sleep time of standby or sleep state has exceeded 2 hours. If YES in step S602, the flow advances to step S603 to execute the same lamp check process as in step S303 in FIG. 9. The flow then advances to step S604 to inform the image processing apparatus 150 of the color correction coefficient, and the apparatus goes to the image scan ready state. By contrast, if the standby or sleep time has not exceeded 2 hours, the control skips steps S603 and S604, and the apparatus goes to the image scan ready state.

The lamp check process (the output level confirmation operation of the document illumination lamp) in the image scanning apparatus 100 will be explained below with reference to FIG. 13. The output level confirmation operation of the document illumination lamp corresponds to details of the lamp check process executed in steps S303, S402, S503, and S603.

In this operation, as shown in FIG. 13, the document illumination lamp 109 is turned on, and a white reference plate is scanned in step S701. In this step, after the control waits for a warm-up time of the document illumination lamp 109, image data obtained by scanning the reference white plate by the CCD 101 is stored in a memory in the shading correction circuit 104 via the AP 102 and AD 103. Image data for a plurality of lines are captured as needed, and the average of these data is stored in the memory Upon completion of capture of image data, the document illumination lamp 109 is turned off.

The flow advances to step S702 to read out image data stored in the memory of the shading correction circuit 104, and obtains R, G, and B maximum values. The flow advances to step S703, and the maximum values obtained in step S703 are compared with the status data of the document illumination lamp 109 stored in the backup RAM 108 to check if each maximum value has a value ±10% or more of the status data of the document illumination lamp 109. Note that the status data of the document illumination lamp 109 stored in the backup RAM 108 was confirmed when the apparatus went to the standby, sleep, or shutdown state previously.

If YES in step S703, the flow advances to step S704; otherwise, the flow jumps to step S706. In step S704, a message that asks the user if the lamp has been exchanged is displayed on the console 180, and it is checked based on an answer input by the user in response to this message if the lamp has been exchanged. If the user's answer indicates that the lamp has been exchanged, the flow advances to step S705; otherwise, the flow jumps to step S706.

In step S705, the status data of the document illumination lamp 109 stored in the backup RAM 108 is initialized, and the color correction coefficient is initialized. In step S706, a corresponding one of the four color correction coefficients stored in the backup RAM 108 is selected based on each maximum value obtained in step S702. Table 1 shows an example of color correction coefficients stored in the backup RAM 108. The color correction coefficients shown in Table 1 are those for the Blue output level from the CCD 101. In general, the Blue output of those from the CCD 101 varies most largely, as shown in FIG. 29.

TABLE 1

| CCD 101 Blue Output Level | Color Correction Coefficient |
| --- | --- |
| 550 mV or higher | No: 1 |
| 500-550 mV | No: 2 |
| 430-500 mV | No: 3 |
| less than 430 mV | No: 4 |

From this Table 1, when the Blue output level is 500 mV or higher, color correction coefficient "No. 1" is selected; when the output level is equal to or higher than 500 mV and less than 550 mV, color correction coefficient "No. 2" is selected; when the output level is equal to or higher than 430 mV and less than 500 mV, color correction coefficient "No. 3" is selected; and when the output level is less than 430 mV, color correction coefficient "No. 4" is selected. Upon selecting the color correction coefficient, the following limitations are imposed. That is, the color correction coefficients can be switched in turn in a direction of "No. 1"→"No. 2"→"No. 3"→"No. 4", but switching in a reverse direction, i.e., a direction of "No. 4"→"No. 3"→"No. 2"→"No. 1", is inhibited. For example, when the Blue output level measured again after color correction coefficient 2 is selected corresponds to color correction coefficient "No. 1", color correction coefficient "No. 2" is held without being switched to "No. 1". On the other hand, when the Blue output level becomes less than 430 mV, since the Red, Green, and Blue output levels suffer nearly no variations in the example shown in FIG. 29, the color correction coefficient is fixed at "No. 4" irrespective of the scanned level of the reference white plate.

After the color correction coefficient is selected in step S706 in this way, the flow advances to step S707, and the values (R, G, and B output levels) obtained by scanning the reference white plate to select the color correction coefficient are stored in the backup RAM 108 as the status data of the document illumination lamp 109. The status data is stored after each measurement. At the same time, data stored in the backup RAM 108 is sent to the image processing apparatus 150. The image processing apparatus 150 stores the received data in a backup RAM (not shown) or the like.

As described above, according to the second embodiment, deterioration of color reproduction due to variations of the characteristics of the document illumination lamp 109 along with an elapse of time can be avoided, and image quality mismatch among identical models of image scanning apparatuses can be relaxed.

Third Embodiment

Figure 14A:
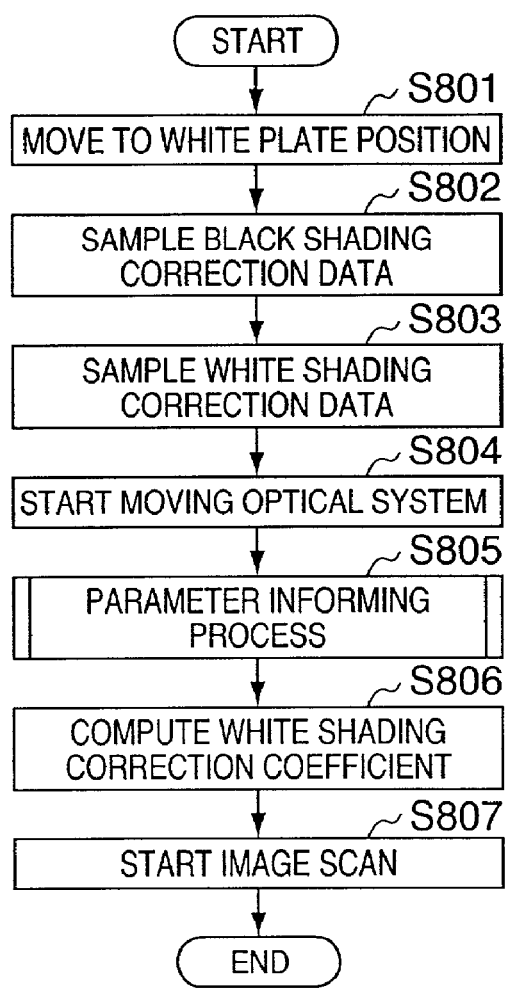
FIGS. 14A and 14B are flow charts showing the image scan operation according to the third embodiment of the present invention.
Figure 14B:
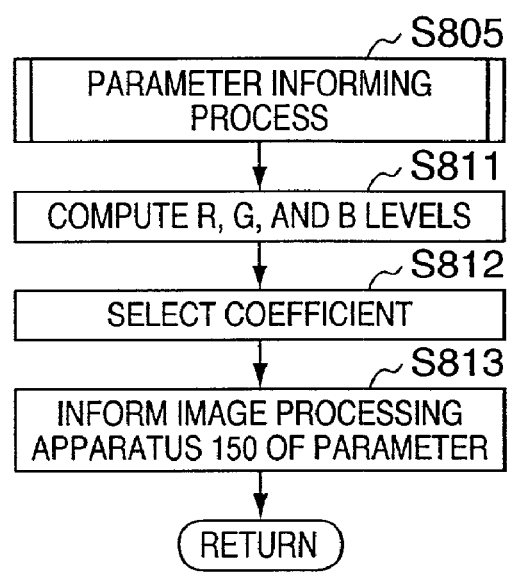

The third embodiment of the present invention will be described below with reference to FIGS. 14A and 14B. FIGS. 14A and 14B are flow charts showing the image scan operation in an image scanning system according to the third embodiment of the present invention. Since the image scanning system of the third embodiment has the same arrangement described in the second embodiment with reference to FIG. 7, a detailed description thereof will be omitted.

When an image scan instruction is input to the image scanning apparatus 100, a movable optical system that mounts the document illumination lamp 109 moves to a position below the reference white plate in step S801, as shown in FIG. 14A. The flow advances to step S802. In step S802, the reference white plate is scanned while the document illumination lamp 109 is kept OFF, and image data obtained by this scan are captured in a memory in the shading correction circuit 104 to sample black shading reference data. The black shading reference data is used in a computation by the CPU 106 to obtain a black shading correction coefficient, which is set in the shading correction circuit 104.

The flow then advances to step S803. In step S803, the reference white plate is scanned while the document illumination lamp 109 is ON, and image data obtained by this scan are captured in a memory in the shading correction circuit 104 to sample white shading reference data. The flow advances to step S804 to begin to move the movable optical system that mounts the document illumination lamp 109 from the position below the reference white plate to the leading end position of a document, so as to scan the document. The flow advances to step S805 to execute a parameter informing process (to be described later) In step S806, a white shading correction coefficient is computed. The parameter informing process and white shading correction coefficient arithmetic operation are executed parallelly in practice. In the white shading correction coefficient arithmetic operation in step S806, an arithmetic operation for computing a white shading correction coefficient is made using the white shading reference data. The computed white shading correction coefficient is set in the shading correction circuit 104. The white shading correction coefficient arithmetic operation in step S806 is completed before the movable optical system reaches the leading end position of the document.

In general, shading correction makes an arithmetic operation in units of pixels of the CCD 101 using:

$$\text{output} = Kdat * \text{input} / \text{White} \quad (4)$$

where input and output are input and output data, Kdat is a calibration target value, and White is white shading reference data. The coefficient computed in step S806 is 1/White. A division circuit required for computing this coefficient requires 6 to 7 clocks per pixel if it is implemented by a hardware circuit. In order to compute correction coefficients for one line, a time for 6 to 7 lines is required. Therefore, the time required for moving the movable optical system from the position below the reference white plate to the leading end position of the document is set to be longer than the shading correction coefficient arithmetic time.

In the parameter informing process in step S805 which is executed parallel to step S806, as shown in FIG. 14B, in step S811 R, G, and B maximum levels are computed based on the white shading reference data captured in step S803. In step S812, the color correction coefficient is selected based on step S812. The flow advances to step S813 to inform the image processing apparatus 150 of parameters including the selected color correction coefficient. The image processing apparatus 150 sets up the masking circuit 154 in accordance with the informed color correction coefficient, and informs the image scanning apparatus 100 that an image scan is ready upon completion of the setup.

The flow advances to step S807, and the control waits for a message from the image processing apparatus 150 indicating that it is ready for an image scan. Upon receiving this message, an image scan starts, thus ending this processing.

As described above, according to the third embodiment, an image with good color reproduction against variations of the document illumination lamp 109 along with an elapse of time, especially, short-term variations can be scanned, in addition to the effect of the second embodiment.

Fourth Embodiment

Figure 15:
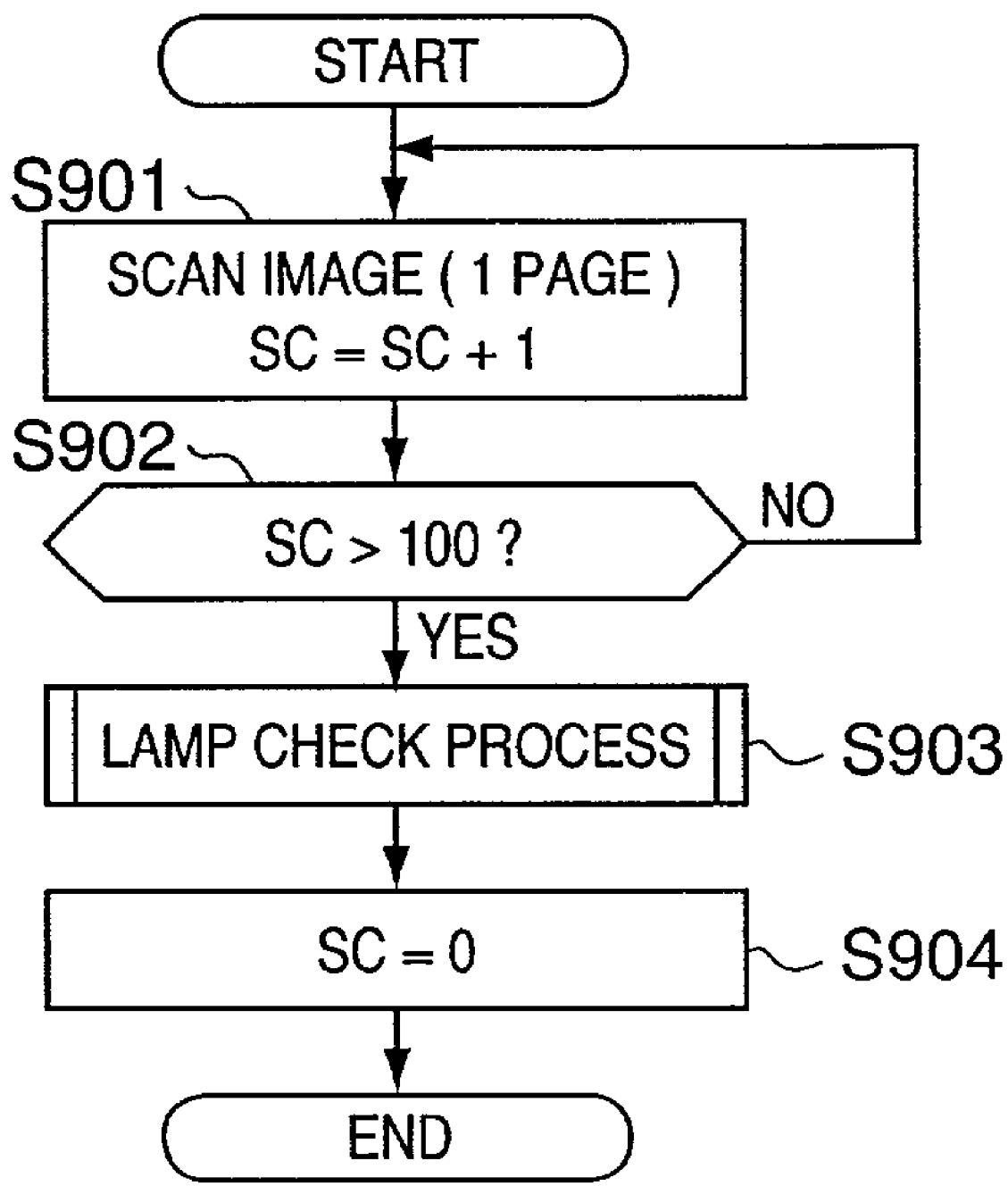
FIG. 15 is a flow chart showing the backup operation of status data of a document illumination lamp according to the fourth embodiment of the present invention.

The fourth embodiment of the present invention will be described below with reference to FIG. 15. FIG. 15 is a flow chart showing the backup operation of status data of a document illumination lamp in the system according to the fourth embodiment of the present invention. Since the image scanning system in the fourth embodiment has the same arrangement as that described in the second embodiment with reference to FIG. 7, a detailed description thereof will be omitted.

In the fourth embodiment, in step S901 a scan counter SC is incremented by "1" upon scanning an image for one page. The flow then advances to step S902 to check if the value of the scan counter SC has exceeded 100. If NO in step S902, the flow returns to step S901; otherwise, the flow advances to step S903.

In step S903, the lamp check process that has been explained in the second embodiment with reference to FIG. 13 is executed. In step S904, the scan counter SC is reset to zero, thus ending this processing.

As described above, according to the fourth embodiment, an image with good color reproduction against short-term variations of the characteristics of the document illumination lamp 109 can be scanned, in addition to the effect of the second embodiment.

Fifth Embodiment

Figure 16:
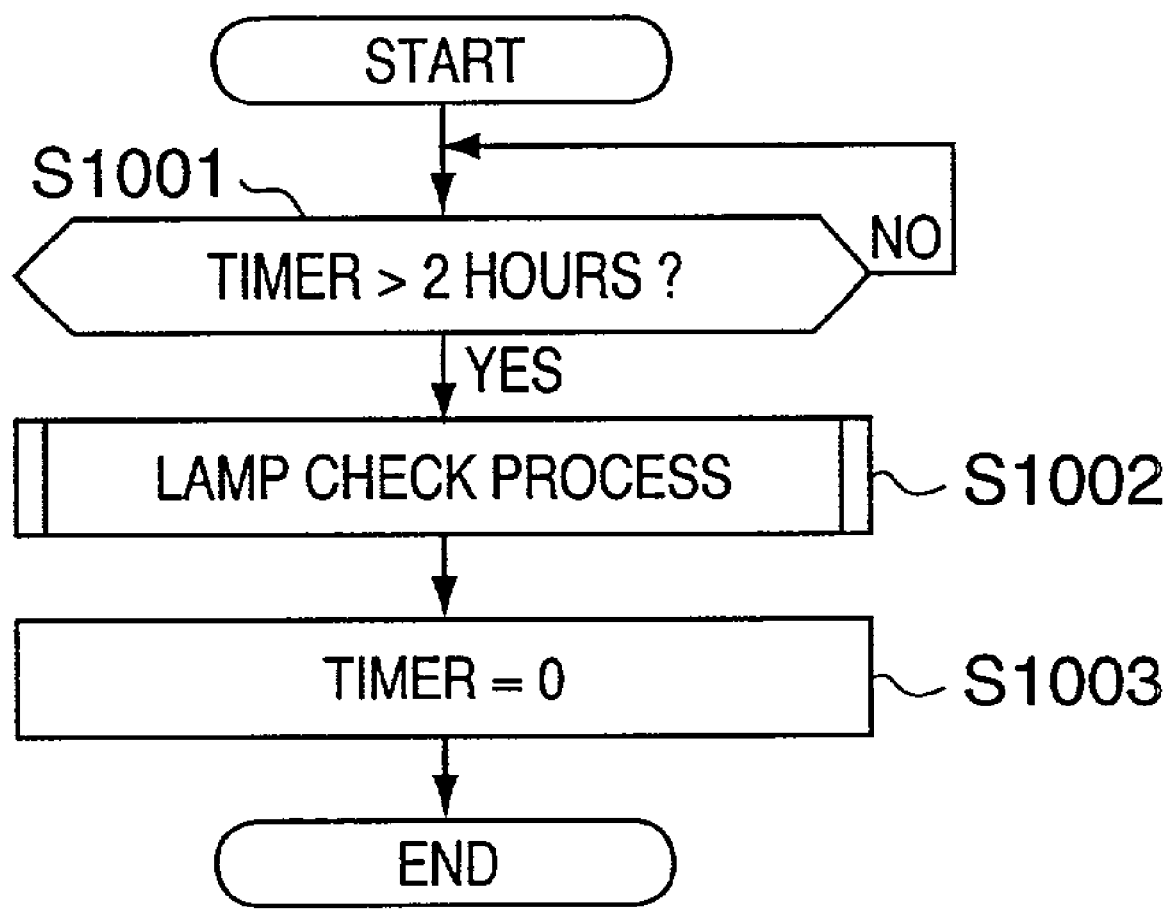
FIG. 16 is a flow chart showing the backup operation of status data of a document illumination lamp according to the fifth embodiment of the present invention.

The fifth embodiment of the present invention will be described below with reference to FIG. 16. FIG. 16 is a flow chart showing the backup operation of status data of a document illumination lamp in the fifth embodiment of the present invention. Since the image scanning system in the fifth embodiment has the same arrangement as that described in the second embodiment with reference to FIG. 7, a detailed description thereof will be omitted.

In the fifth embodiment, it is monitored in step S1001 if the time measured by a timer which measures the operation time of the image scanning apparatus 100 has exceeded 2 hours. If YES in step S1001, the flow advances to step S1002. In step S1002, the lamp check process that has been explained in the second embodiment with reference to FIG. 13 is executed. In step S1003, the timer is reset to zero, thus ending this processing.

Figure 17:
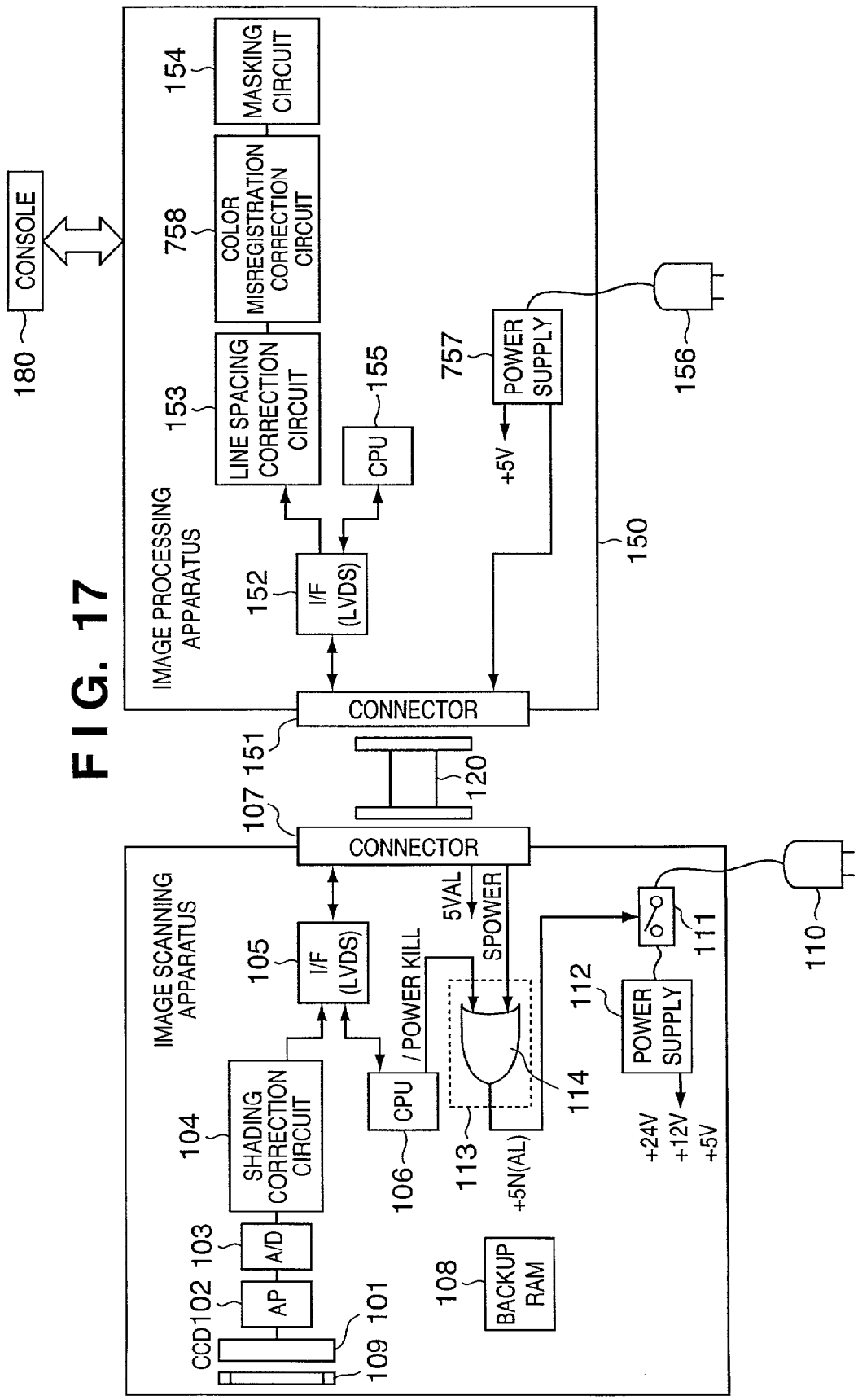
FIG. 17 is a block diagram showing the arrangement of an image processing system according to the sixth embodiment of the present invention.

As described above, according to the fifth embodiment, an image with good color reproduction against short-term variations of the characteristics of the document illumination lamp 109 can be scanned, in addition to the effect of the second embodiment Sixth Embodiment FIG. 17 shows the arrangement of an image processing system according to the sixth embodiment of the present invention.

Differences between the image scanning system in the sixth embodiment shown in FIG. 17 and the arrangement shown in FIG. 1 are that a color misregistration correction circuit 758 is used in place of the table conversion circuit 158, a second DC power supply 757 also supplies electric power of +5 V (AL) to a circuit block 113 of the image scanning apparatus 100 via the cable 120, the circuit block 113 is added, and the circuit block 113 is controlled by the first CPU 106. Since other arrangements are the same as those described in the first embodiment with reference to FIG. 1, a detailed description thereof will be omitted, and the differences will be mainly explained below.

In this embodiment, the image scanning apparatus 100 supports only equal-magnification image scan, and a zoom process (enlargement/reduction) is realized by an image process of the image processing apparatus 150 using a page memory (not shown) in both the main scan and sub-scan directions.

The circuit block 113 controls the AC relay switch 111, and receives a power supply of +5 V (AL) from the image processing apparatus 150. The circuit block 113 also receives an SPOWER signal from the image processing apparatus 150, and a /POWER_KILL signal output from the first CPU 106. These two signals are input to an OR gate 114, which outputs Hi level if one of the input signals is at Hi level, thus turning on the AC relay switch 111. A practical control method will be described later.

The CCD line sensor 101 in the sixth embodiment comprises three, i.e., R, G, and B photodiode arrays, and has the same arrangement as that in the prior art shown in, e.g., FIG. 26 (photodiode spacing=8 lines). Therefore, the line spacing of the CCD line sensor 101 corresponds to 8 lines, and the line spacing correction circuit 153 delays a red (R) signal by 16 lines and a green (G) signal by 8 lines with reference to a blue (B) signal.

In the sixth embodiment, the backup RAM 108 saves color misregistration characteristic data of the image scanning apparatus 100. The color misregistration characteristic data include RB and GB misregistration characteristic data indicating deviations of R and G from a reference (e.g., B). These color misregistration characteristic data pertain to only equal-magnification scan in this embodiment.

Figure 21:
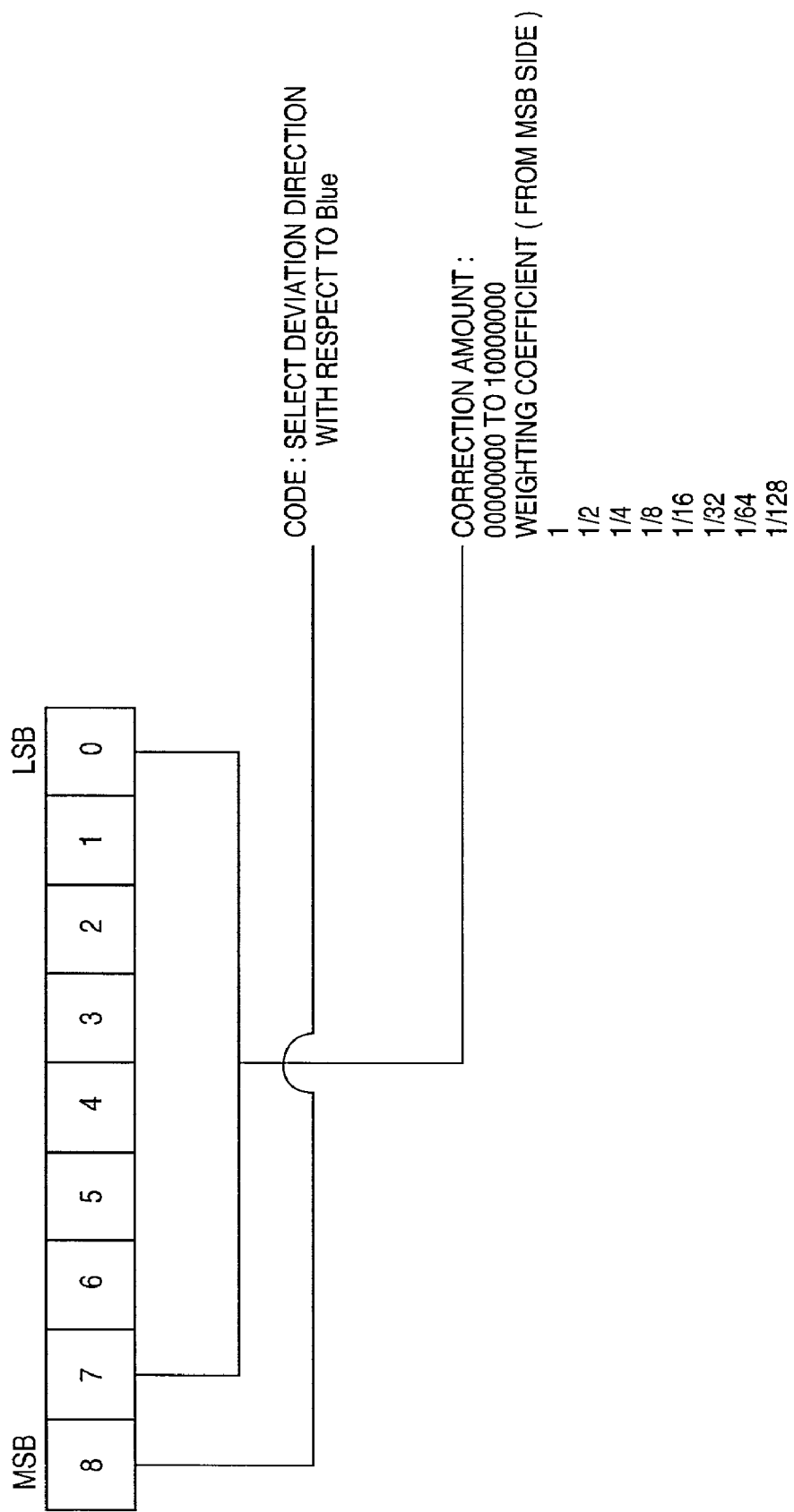
FIG. 21 shows the format of color misregistration characteristic data saved in a backup RAM according to the sixth embodiment of the present invention.

FIG. 21 shows details of the RB color misregistration characteristic data saved in the backup RAM 108 (the same applies to the GB color misregistration characteristic data) The RB (or GB) color misregistration characteristic data consists of 9 bits, and the most significant bit indicates a code (indicating a direction toward or away from a B pixel) that represents a direction of deviation with respect to a B pixel as a reference pixel. More specifically, this code is set to be 0 when the signal phase leads a reference signal (an appropriate phase of the corresponding color signal) or 1 when the signal phase lags behind it.

The remaining 8 bits represent a correction amount (unit: lines). The upper limit setup value is 10000000 (B: binary) Data more than this value is ignored and is fixed to be 10000000(B) if such data is set. Respective bits of the 8-bit data that represents the correction amount are respectively weighted by 1, ½, ¼, ⅛, 1/16, 1/32, 1/64, 1/128 from the MSB side, and the upper limit value=10000000(B) becomes 1, as described above. Also, color misregistration correction can be achieved to have a 1/128 line as a minimum unit.

In the following description, the RB color misregistration characteristic data that represents color misregistration of an R (RED) signal will be explained as CR[8:0], and the GB color misregistration characteristic data that represents color misregistration of a G (GREEN) signal as CG[8:0].

Assume that the image scanning apparatus 100 has the following color misregistration characteristics in addition to a phase shift corresponding to a predetermined line spacing (8 lines) in a 1×-speed scan.

(1) The R (RED) signal has a phase lead of 0.0638 lines relative to the B (BLUE) signal.

(2) The G (GREEN) signal has a phase lag of 0.0467 lines relative to the B (BLUE) signal.

Therefore, CR[8:0] and CG[8:0] saved in the backup RAM 108 are set with the following binary data values:

CR[8:0]: 000001000 (phase lead of 0.0625 lines)
CGC[8:0]: 100000110 (phase lag of 0.0468 lines)

The color misregistration correction circuit 758 corrects color misregistration (see FIG. 27B and its explanation) of a signal that has undergone line spacing correction. The arrangement and operation of this circuit will be described later.

Figure 20:
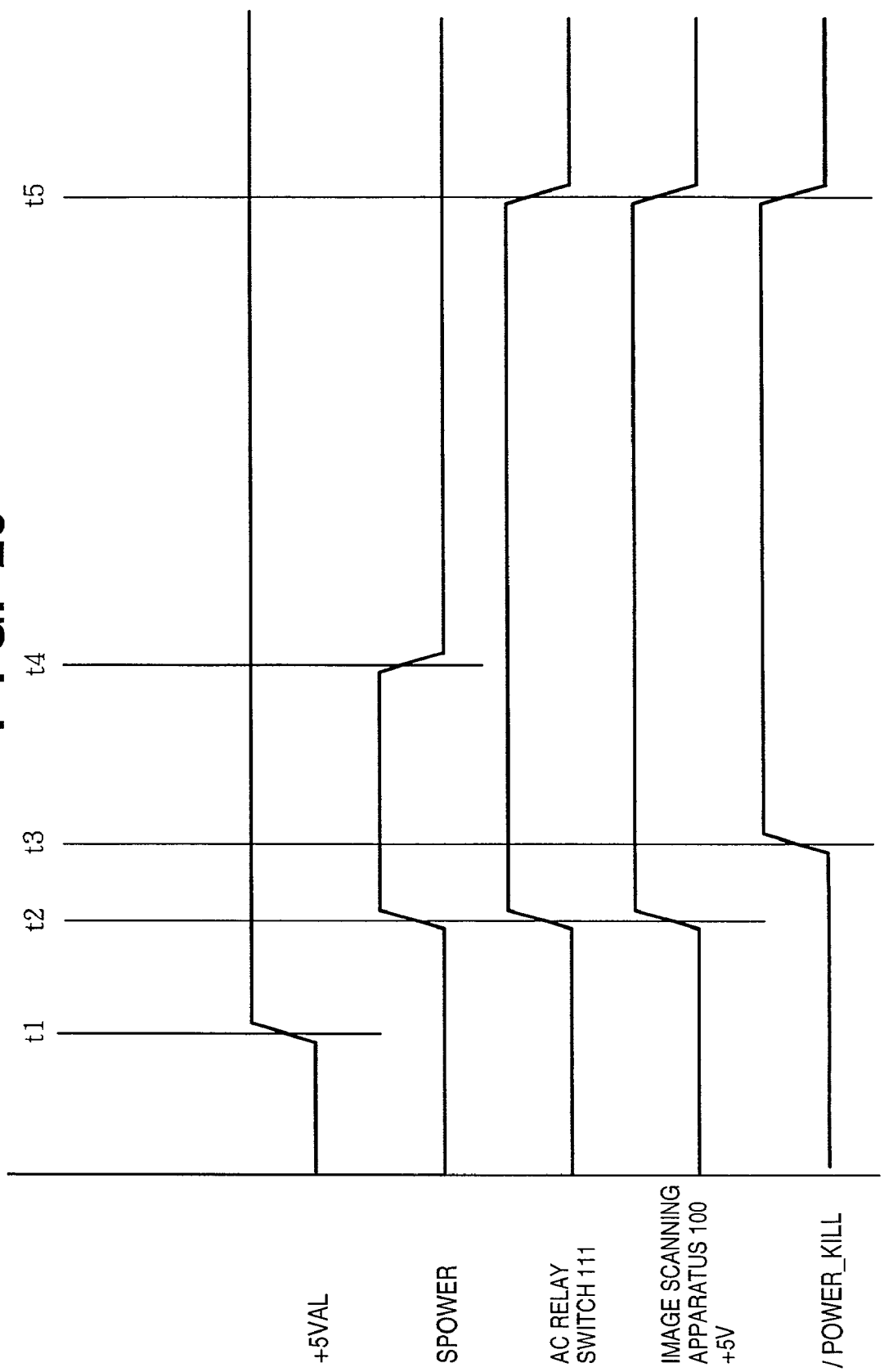
FIG. 20 is a timing chart of power supply control of an image scanning apparatus according to the sixth embodiment of the present invention.

FIG. 20 is a timing chart for explaining the operation (power supply control of the image scanning apparatus 100) of the circuit block 113. The power supply control state of the image scanning apparatus 100 changes at five timings t1 to t5. In the following description, assume that the AC plugs 110 and 156 are connected to a commercial power supply.

(1) t1: supply of power supply +5 V (AL)

The second power supply 757 supplies a power supply of +5 V (AL) to the circuit block 113. At this time, the AC relay switch 111 is OFF, and the signal /POWER_KILL supplied from the first CPU 106 is at Lo level. Also, the signal SPOWER supplied from the image processing apparatus 150 is at Lo level. Hence, the AC relay switch 111 maintains OFF.

(2) t2: SPOWER signal ON

The image processing apparatus 150 drives the signal SPOWER to Hi level. As a result, the OR gate 114 outputs Hi level, the AC relay switch 111 is turned on, and the power supply 112 activates other power supplies (+5 V and the like) of the image scanning apparatus 100.

(3) t3: change /POWER_KILL signal to Hi level

The first CPU 106 drives the signal /POWER_KILL to Hi level in the startup process to maintain power supply by self control. At the same time, the first CPU 106 informs the image processing apparatus 150 of completion of power supply activation.

(4) t4: SPOWER signal OFF

Upon confirmation of power supply activation of the image scanning apparatus 100, the image processing apparatus 150 turns off the signal SPOWER and places the control of the AC relay switch 111 with the first CPU 106.

(5) t5; power supply stop

Power supply is stopped by causing the first CPU 106 to control the AC relay switch 111 by itself (a) upon receiving request from image processing apparatus 150

(b) upon starting energy saving mode

In either case, prior to power supply stop, processes such as saving of parameters in the backup RAM 108, stopping of driving of loads such as motors and the like, power supply stop confirmation and notification to the image processing apparatus 150, and the like are executed, and power supply is stopped with the approval of the image processing apparatus 150.

Figure 18:
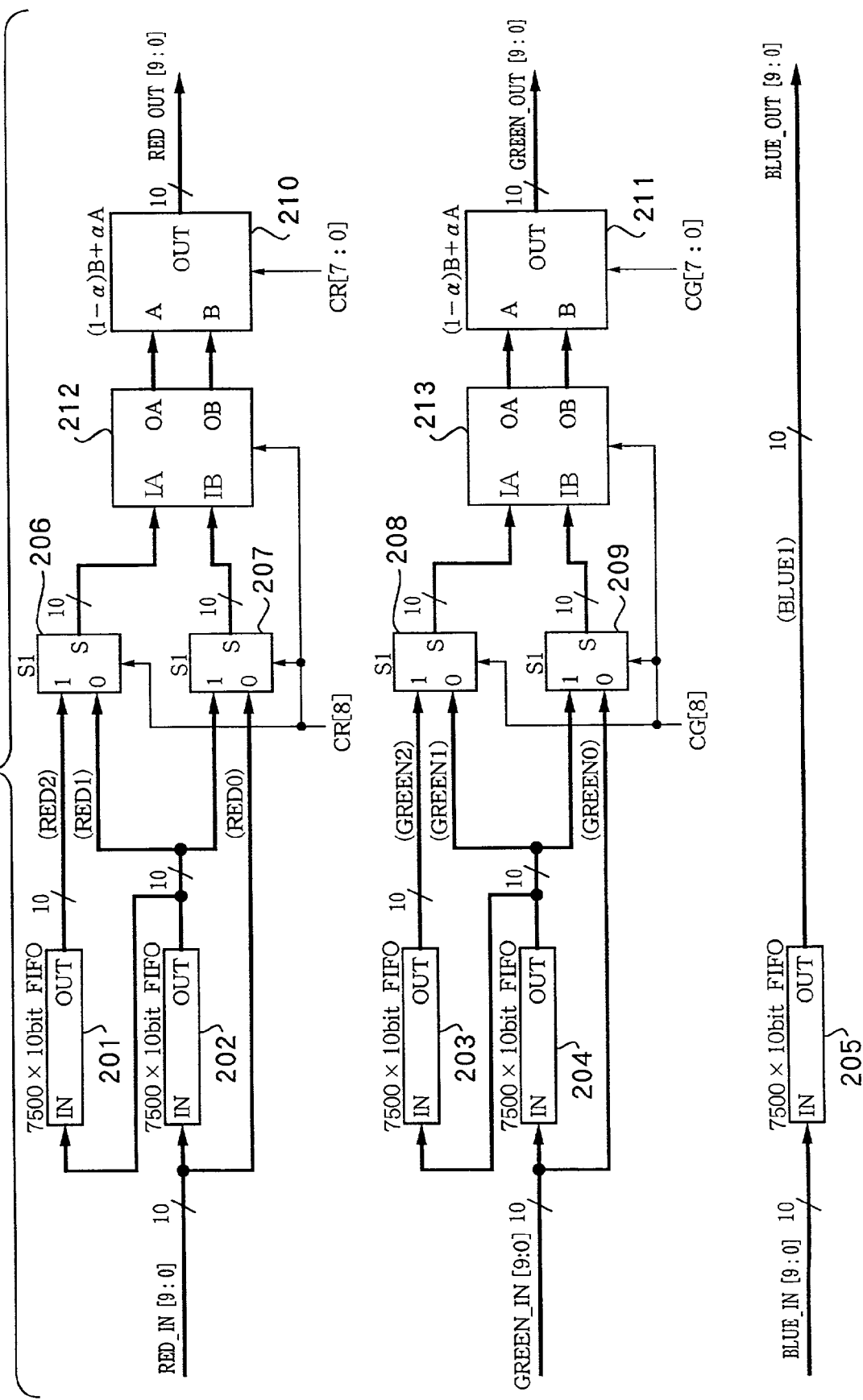
FIG. 18 is a block diagram showing details of the arrangement of a color misregistration correction circuit according to the sixth embodiment of the present invention.

The color misregistration correction circuit 758 will be explained below with reference to FIG. 18. Reference numerals 201 to 205 denote FIFO memories for executing a 1-line delay process. Each of the FIFO memories 201 to 205 has a capacity of 10 bits×7,500 pixels.

Reference numerals 206 to 209 denote selectors. The selectors 206 to 209 are 2-input/1-output 10-bit bus selectors, and the selectors 206 and 207 are controlled by MSB CR[8] of color misregistration characteristic data CR[8:0] of the R signal mentioned above. The selectors 208 and 209 are controlled by MSB CG[8] of color misregistration characteristic data CG[8:0] of the G signal.

Reference numerals 210 and 211 denote arithmetic devices. The arithmetic devices 210 and 211 are 2-input/1-output arithmetic devices, and have an I/O bit width of 10 bits. The arithmetic devices 210 and 211 make linear interpolation arithmetic operations between inputs A and B, and execute the following arithmetic operation using a coefficient α as a parameter with reference to input B:

$$(1-\alpha)B+\alpha A$$

where α is set within the range from 0 to 1 (unit: lines).

The coefficient α of the arithmetic device 210 is set by the lower 8 bits of R color misregistration characteristic data CR[8:0], and that of the arithmetic device 211 is set by the lower 8 bits of G color misregistration characteristic data CG[8:0].

Reference numerals 212 and 213 denote 2-input/2-output selectors. Each of the selectors 212 and 213 has two inputs IA and IB, and two outputs OA and OB, which are controlled by MSB (control bit) CR[8] or CG[8] of CR[8:0] or CG[8:0] as follows.

(1) When the control bit is 1,the output value of the terminal OA is the input value of the terminal IB, and the output value of the terminal OB is the input value of the terminal IA.

(2) When the control bit is 0, the output value of the terminal OA is the input value of the terminal IA, and the output value of the terminal OB is the input value of the terminal IB.

Since the B signal is used as a reference upon correcting color misregistration, no arithmetic device for correcting the B signal is provided, and the B signal undergoes only reference delay (1-line delay process) by the FIFO 205.

In the above arrangement, the following process is done upon starting up the system. The power supplies of the image processing apparatus 150 and image scanning apparatus 100 are activated in accordance with the sequence mentioned above with reference to FIG. 20.

The image scanning apparatus 100 reads out RB color misregistration characteristic data CR. [8:0] and GB color misregistration characteristic data CG[8:0] as its own characteristic values from the backup RAM 108, and sends them to the image processing apparatus 150. Alternatively, the second CPU 155 of the image processing apparatus 150 may directly access the backup RAM 108 to fetch color misregistration characteristic data.

The RB color misregistration characteristic data CR[8:0] =000001000(B) and GB color misregistration characteristic data CG[8:0]=100000110(B) sent to the image processing apparatus 150 are set in the color misregistration correction circuit 758.

Upon completion of the startup process including the aforementioned process, the apparatus 100 is ready to copy.

Upon receiving a copying instruction, the document illumination lamp 109 is turned on, and R, G, and B signals are scanned by the CCD line sensor 101. The scanned R, G, and B signals undergo a shading correction process of the shading correction circuit 104 while they maintain a phase difference of 8 lines, and the corrected signals are supplied to the image processing apparatus 150 via the cable 120.

In the image processing apparatus 150, the line spacing correction circuit 153 executes a correction process of the phase difference of 8 lines for the R, G. and B signals, and supplies the corrected signals to the color misregistration correction circuit 758.

The process in the color misregistration correction circuit 758 will be explained below with reference to FIG. 19.

Figure 19:
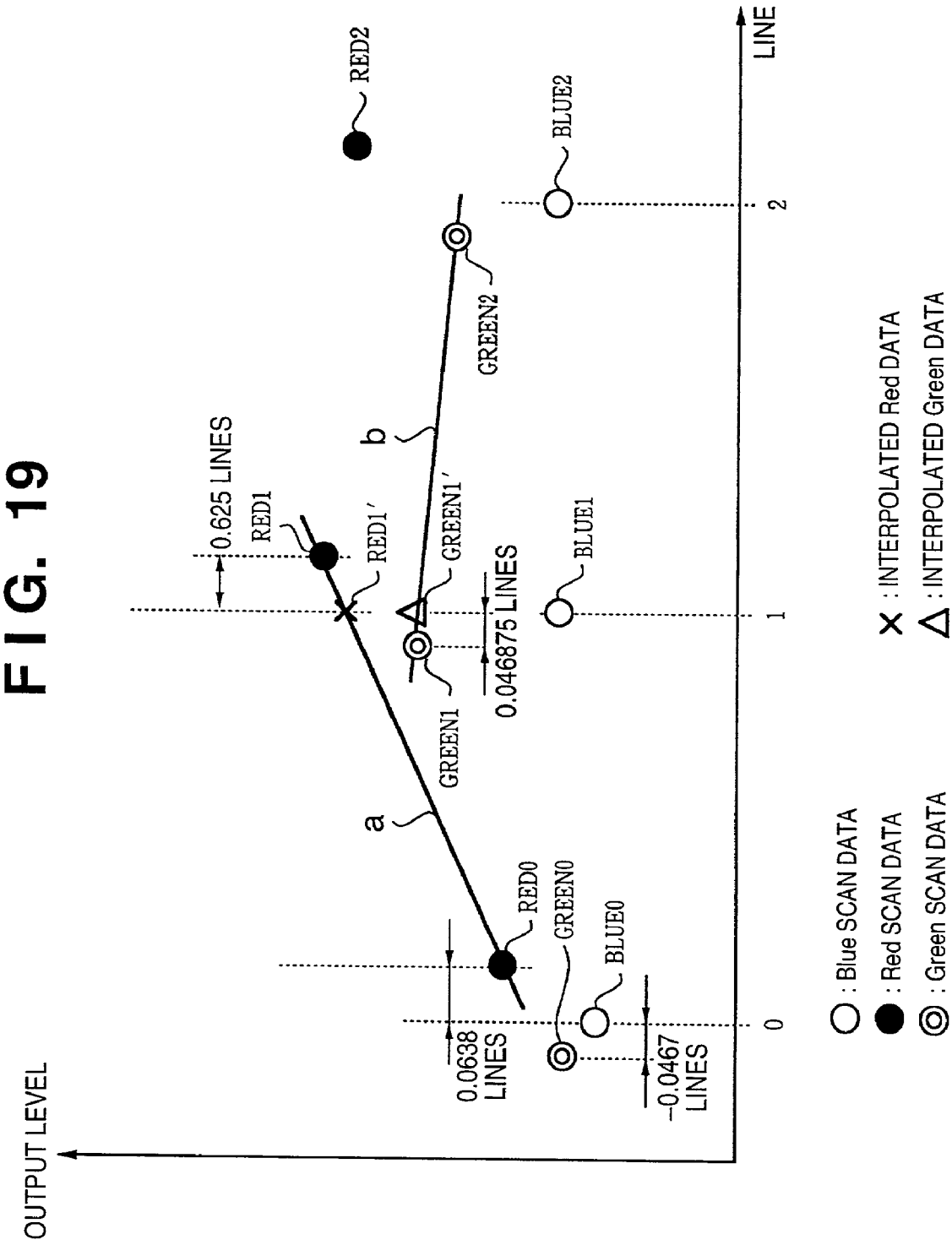
FIG. 19 is a view for explaining a color misregistration correction process in the color misregistration correction circuit according to the sixth embodiment of the present invention.

FIG. 19 plots data for three lines after three R, G, and B pixels (those having a common main scan direction) are scanned by the CCD line sensor 101 and are processed by the line spacing correction circuit 153.

○ (open circle), ● (full circle), and ô (double circle) respectively indicate B, R, and G signals. B data corresponding to lines 0, 1, and 2 are BLUE0, BLUE1, and BLUE2, R data corresponding to lines 0, 1, and 2 are RED0, RED1, and RED2, and G data corresponding to lines 0, 1, and 2 are GREEN0, GREEN1, and GREEN2. In each line, the R data has a phase lead of 0.063 lines and G data has a phase lag of 0.0467 lines both relative to B.

The correction process will be explained below taking line 1 as an example. In line 1,points indicated by x and Δ are RED1' and GREEN1' data to be obtained by color misregistration correction.

The MSB data of R color misregistration data CR[8:0] is set to be 0, and the selectors 206 and 207 supply a signal RED1 to the terminal IA of the selector 212, and a signal RED0 to the terminal IB.

Since RB color misregistration data CR[8] is 0, the selector 212 supplies the data input at the terminal IA to the terminal OB, and the data input at the terminal IB to the terminal OA. Therefore, a terminal A of the arithmetic device 210 receives the signal RED0, and its terminal B receives the signal RED1.

The arithmetic device 210 computes, with reference to the input data at the terminal B, data at a position separated by the number of lines (00001000(B)=0.0625 lines) designated by RB color misregistration data CR[7:0] from the input data at the terminal B on an approximate line from the input data at the terminal B to that at the terminal A. This data corresponds to a value at a position separated by 0.0625 lines from RED1 to RED0 on a line that connects RED1 and RED0 in FIG. 19. The value at that position is a value at a position with a phase lead of 0.0013 lines relative to BLUE1 data, i.e.,RED1'.

Likewise, corrected data GREEN1' is computed as follows. Since MSB data CG[8]=1 in GB color misregistration data CG[8:0], the terminal A of the arithmetic device 213 receives a signal GREEN1,and the terminal B receives a signal GREEN2.

Since CG[7:0]=00000110(B)=0.046875 lines, a value at a position separated by 0.046875 lines from GREEN1 toward GREEN2 is computed as GREEN1'. The data GREEN1 has a value at a position with a phase lead of 0.000175 lines relative to data BLUE1.

With the aforementioned operation, color misregistration correction is done, and the corrected image data are supplied to the subsequent processes.

Note that errors (RED1': 0.0013 lines, GREEN1': 0.000175 lines) produced by correction may be negligible since they are small enough. If correction with higher precision is required, the precision of the arithmetic devices 210 and 211 and the number of bits of color misregistration characteristic data may be increased as needed.

With the above operation, a scanned image that has undergone the color misregistration correction process can be obtained. In the system according to this embodiment, color misregistration characteristic data saved in the backup RAM 108 are unique to an individual image scanning apparatus 100. Therefore, this embodiment can cope with a case wherein a given image scanning apparatus 100 is temporarily replaced by another image scanning apparatus 100 for maintenance or to build a system with higher productivity or higher image quality. That is, since the newly connected image scanning apparatus has unique color misregistration characteristic data in its own backup memory 108, color misregistration correction that matches the new image scanning apparatus can be done. Hence, for example, deterioration of text reproduction caused by color misregistration can be prevented, and reproduction of text quality can be maintained.

As described above, according to the sixth embodiment, an external apparatus (e.g., an image processing apparatus connected via a communication line) of an image sensing apparatus can appropriately correct spatial positional deviations among pixel signals of a plurality of colors (e.g., R, G, and B) irrespective of models or characteristics of image sensing apparatuses.

In the sixth embodiment, the image processing system including the image scanning apparatus has been exemplified. Also, the sixth embodiment can be applied when the image scanning apparatus is replaced by a digital camera such as a video camera, digital still camera, or the like.

Seventh Embodiment

Figure 22:
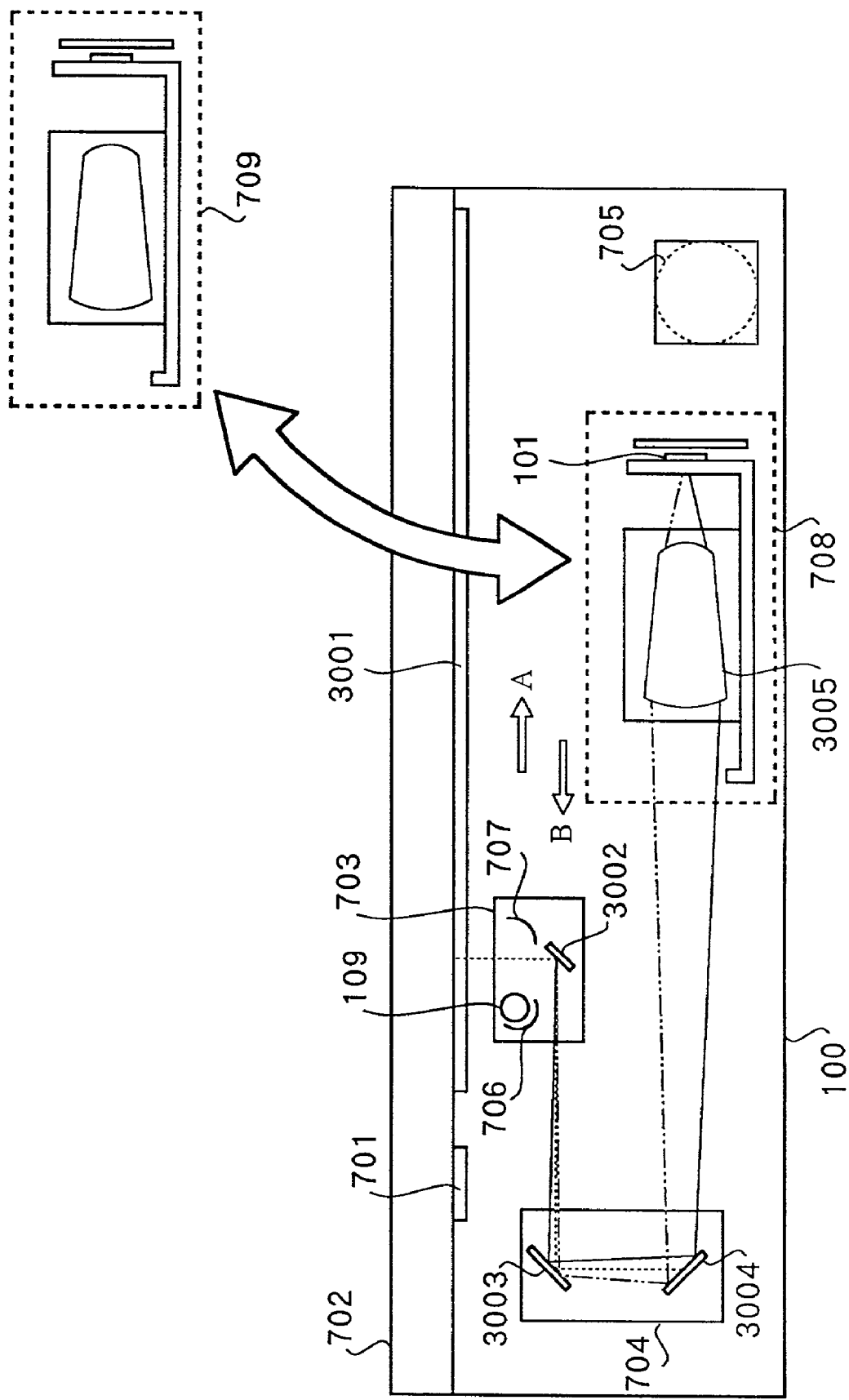
FIG. 22 is a sectional view showing the arrangement of an image forming apparatus according to the seventh embodiment of the present invention.

The seventh embodiment will be described below. In the seventh embodiment, some components of the hardware arrangement of the image scanning apparatus 100 are different from those in the sixth embodiment. FIG. 22 is a view for explaining differences in the image scanning apparatus 100 according to the seventh embodiment. Note that the overall arrangement of the image scanning system is common to that in the sixth embodiment shown in FIG. 17. A description of items that have already been explained in the prior art and sixth embodiment and are common to this embodiment will be omitted to avoid a repetitive description, and only different characteristic features will be explained below.

Referring to FIG. 22, reference numeral 701 denotes a reference white plate. The reference white plate 701 is used upon obtaining a reference signal for shading correction, and is made up of a material which is free from any variations of color tone due to a change in environmental condition such as temperature, humidity, or aging.

Reference numeral 702 denotes a document pressing plate. The document pressing plate 702 presses a document placed on a platen glass 301 to prevent a document from floating from the platen glass 301, and also serves as a cover for preventing the platen glass 3001 from stains or damages.

Reference numeral 703 denotes a first mirror table. The document illumination lamp 109 and a first mirror 3002 are mounted on the first mirror table 703 to illuminate a document, and guide light reflected by the document to a second mirror 3003. Reference numeral 704 denotes a second mirror table. On the second mirror table 704, the second mirror 3003 and a third mirror 3004 are mounted.

Reference numeral 705 denotes an optical motor. The optical motor 705 drives the first and second mirrors tables 703 and 704 in the directions of arrows A and B. The optical motor 705 normally uses a stepping motor, DC motor, or the like.

Reference numeral 706 denotes a first reflector. The first reflector 706 is disposed to improve the efficiency of the document illumination lamp 109, and mainly has a role of focusing a light beam which is emitted toward the side opposite to the document surface onto the document surface. Reference numeral 707 denotes a second reflector. The second reflector 707 improves the efficiency of the document illumination lamp 109 and focuses a light beam onto the document surface like in the first reflector, so as to suppress generation of shadows upon scanning a document on which some paper pieces are pasted or a three-dimensional document.

Reference numeral 708 denotes a lens unit. The lens unit 708 includes an optical lens 3005 and the CCD line sensor 101, and is an exchangeable unit. Reference numeral 709 denotes an exchange lens unit constituted by the same functional components as those of the lens unit 708.

Details and a measurement method of color misregistration characteristic data according to this embodiment will be described below. Color misregistration characteristic data according to the seventh embodiment consists of two elements (color misregistration parameters).

One element pertains to the lens unit 708 and is a color misregistration parameter which is caused by eccentricity resulting from tolerance, deformation, or the like upon assembling a lens unit. CC(A) represents this parameter.

The other element pertains to the main body of the image scanning apparatus 100, and is a color misregistration parameter that changes depending on distortion of a frame or the imaging precision and the like of the first, second, and third mirrors 3002, 3003, and 3004. CC(B) represents this parameter.

The level of color misregistration in an image scanned by the image scanning apparatus 100 is defined by adding the two color misregistration parameters CC(A) and CC(B), and CC(C) represents this level.

That is, the three parameters satisfy:

$$CC(C)CC(A)+CC(B) \quad (1)$$

The parameters are measured or determined as follows.

CC(A) After a lens unit is assembled, the position of a beam spot on the imaging surface is measured by monitoring the path of the beam spot, and is calibrated by the line distance of the CCD line sensor 101 to be converted into a color misregistration amount.

CC (C): This parameter is determined from a scanned image. The position of an edge portion is detected for each color from an image obtained by scanning a line pattern which is periodic in the sub-scan direction, and executing line spacing correction of the CCD line sensor 101, and a positional deviation of this position is defined as a color misregistration amount.

CC(B): This parameter cannot be measured without the lens unit 708, since incoming light cannot be focused. Therefore, this parameter is computed in accordance with equation (1) from the two color misregistration amounts.

A correction method of a color misregistration amount when one lens unit 708 is exchanged with another lens unit 709 will be explained below.

The backup RAM 108 of the image scanning apparatus 100 saves parameters CC(A), CC(B), and CC(C) which form color misregistration characteristic data.

CC(A) indicates the color misregistration amount of the lens unit 708, CC(C) is the color misregistration amount computed based on an image scanned by the image scanning apparatus 100 while the lens unit 708 is mounted, and CC(B) is the color misregistration amount which is unique to the main body of the image scanning apparatus 100 and is computed according to equation (1).

Figure 23:
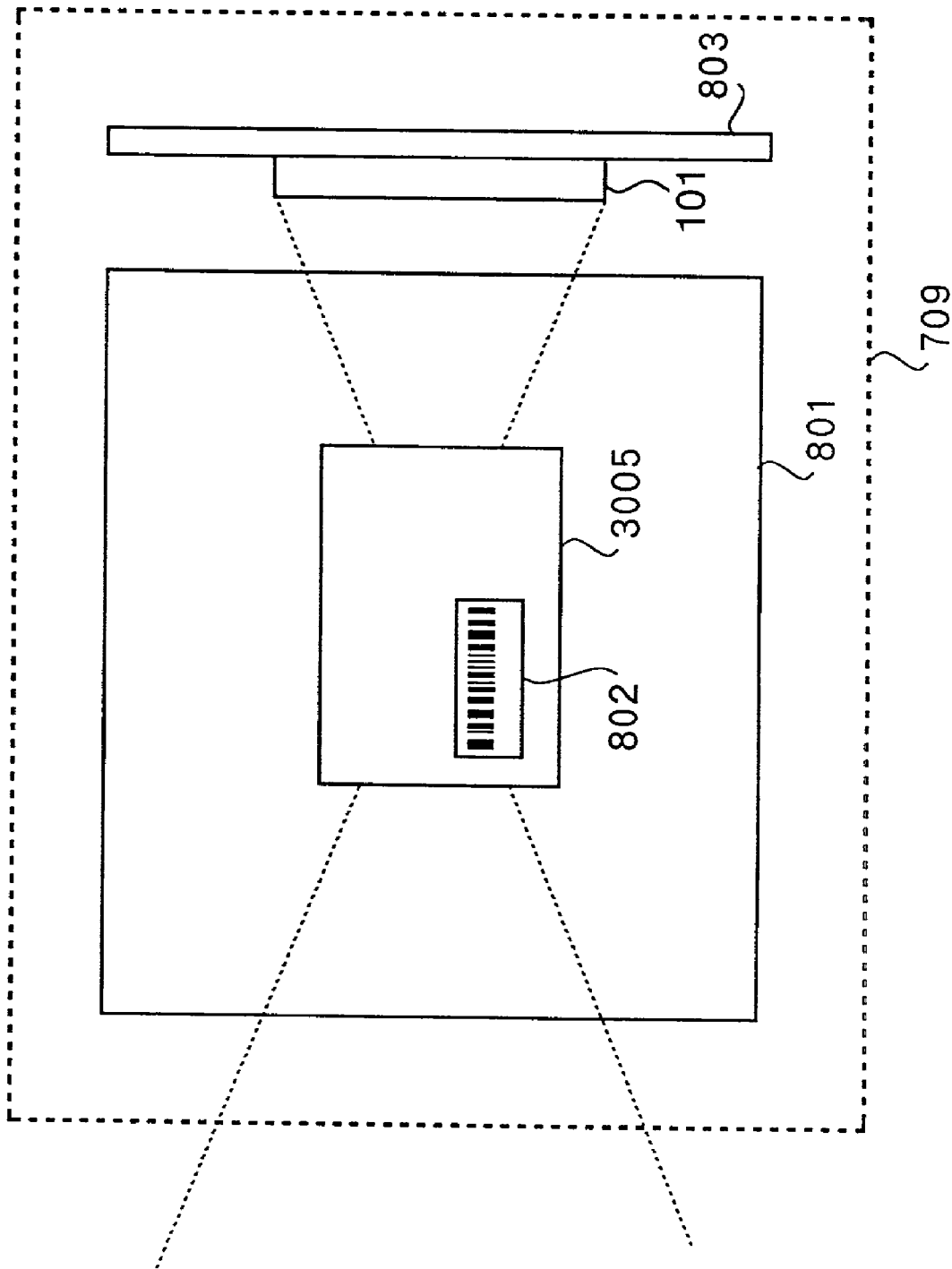
FIG. 23 is a view showing an exchange lens unit according to the seventh embodiment of the present invention.

On the other hand, the color misregistration parameter of the exchange lens unit 709 is CC(A)'. FIG. 23 shows an indication portion (barcode label) that indicates information which represent the color misregistration parameter CC(A)' in the exchange lens unit 709.

Reference numeral 801 denotes a lens base. The lens base 801 is a base plate to which the lens 3005 is attached. Reference numeral 802 denotes a barcode label. The barcode label 802 is adhered to the lens 3005. On the barcode label 802, a barcode and numerical value information that represent the color misregistration parameter CC(A)' in the exchange lens unit 709 are printed.

The barcode label 802 need not always be adhered to the lens 3005, but is preferably adhered to a portion that can assure high work efficiency in consideration of a process for measuring the color misregistration amount unique to the exchange lens unit 709. More specifically, if the color misregistration amount is measured after the lens base 801 and lens 3005 are assembled, the barcode label 802 is preferably adhered to the lens base 801.

Reference numeral 803 denotes a CCD drive board for driving the CCD 101. When the lens unit 708 is exchanged with the exchange lens unit 709, CC(A)' printed on the barcode label 802 is input to the image scanning apparatus 100. More specifically, the barcode of CC(A)' may be read by a reader and input to the image scanning apparatus 100 or may be read by the operator and input at the console 180.

Since the color misregistration parameter CC(B) that indicates the color misregistration amount of the image scanning apparatus 100 main body in an initial state does not depend on exchange of the lens unit, if CC(C)' represents a color misregistration parameter that indicates the color misregistration amount of the image scanning apparatus 100 with the exchange lens unit 309, CC(C)' is given by:

$$CC(C)'=CC(B)+CC(A)' \qquad (2)$$

Upon exchanging the lens unit, the data saved in the backup RAM 108 are written by CC(A)', CC(B), and CC(C)', and at the same time, a message indicating that the color misregistration amount has been changed and the changed contents (color misregistration characteristic data) is sent to the image processing apparatus 150. The image processing apparatus 150 sets the changed color misregistration characteristic data in the color misregistration correction circuit 158, thus completing a change in color misregistration amount upon exchanging the lens unit.

As described above, since the color misregistration amount of the exchange lens unit 709 is acquired and is set in the image scanning apparatus 100, color misregistration characteristic data can be appropriately modified even when the lens unit is changed. Therefore, deterioration of text reproduction caused by color misregistration upon exchange of a lens unit can be prevented, and reproduction of text quality can be maintained.

As described above, according to the seventh embodiment, in addition to the effects of the sixth embodiment, spatial positional deviations (color misregistration) of pixel signals can be appropriately corrected irrespective of an exchange of a unit, or control or adjustment of optical elements to attain a zoom process or the like in addition a change in model or characteristics of an image sensing apparatus.

Eighth Embodiment

In the eighth embodiment, the color misregistration correction amount is changed in correspondence with the zoom ratio upon zooming a scanned image. In the eighth embodiment, the image scanning apparatus 100 realizes a zoom process in the sub-scan direction (a direction perpendicular to the CCD line sensor) by changing the scan speed in correspondence with the zoom ratio. Note that items which are not mentioned in the following description comply with the description of the sixth and seventh embodiments.

Figure 24:
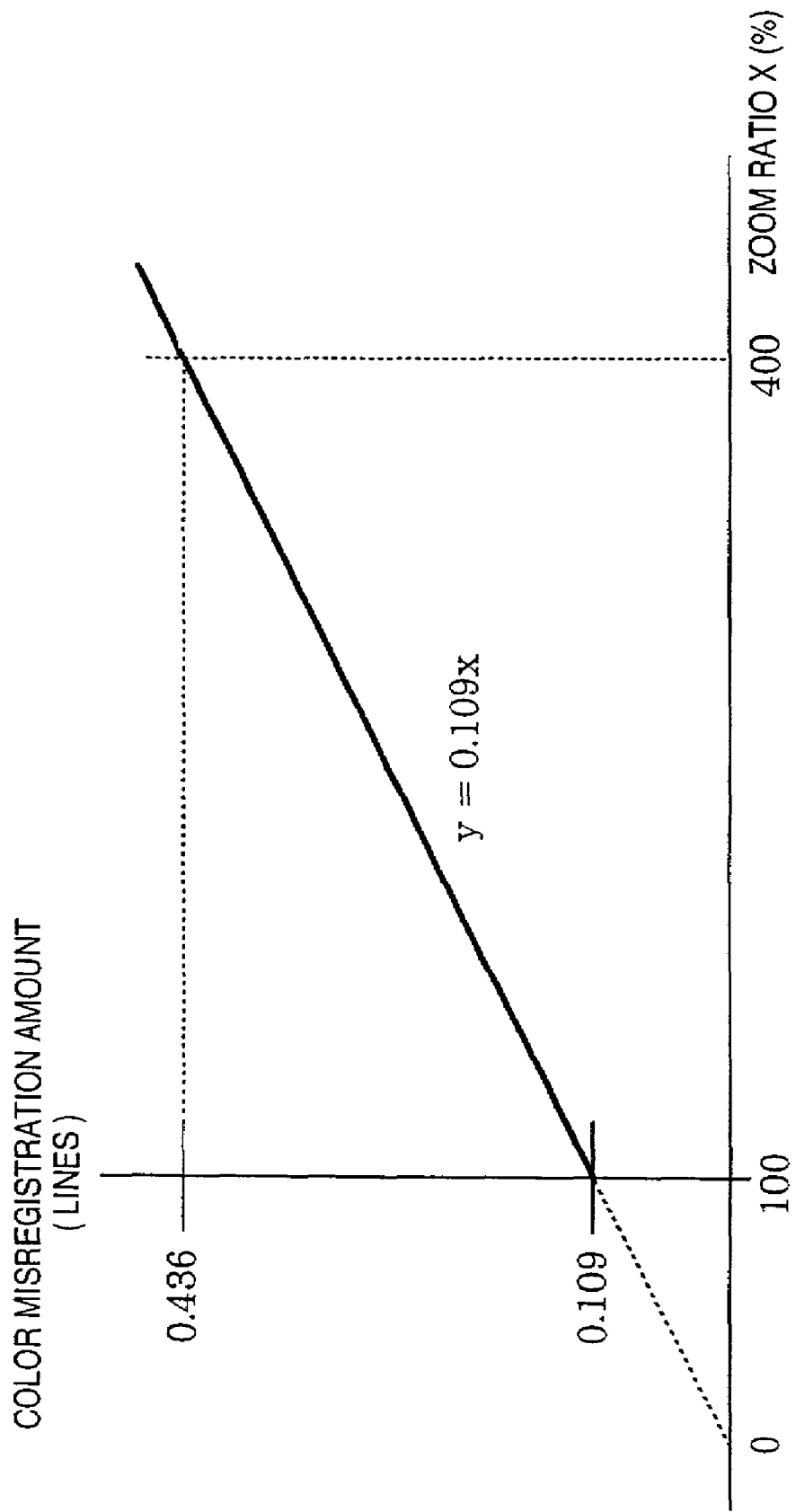
FIG. 24 is a graph showing the relationship between the zoom ratio and color misregistration amount according to the eighth embodiment of the present invention.
Figure 25:
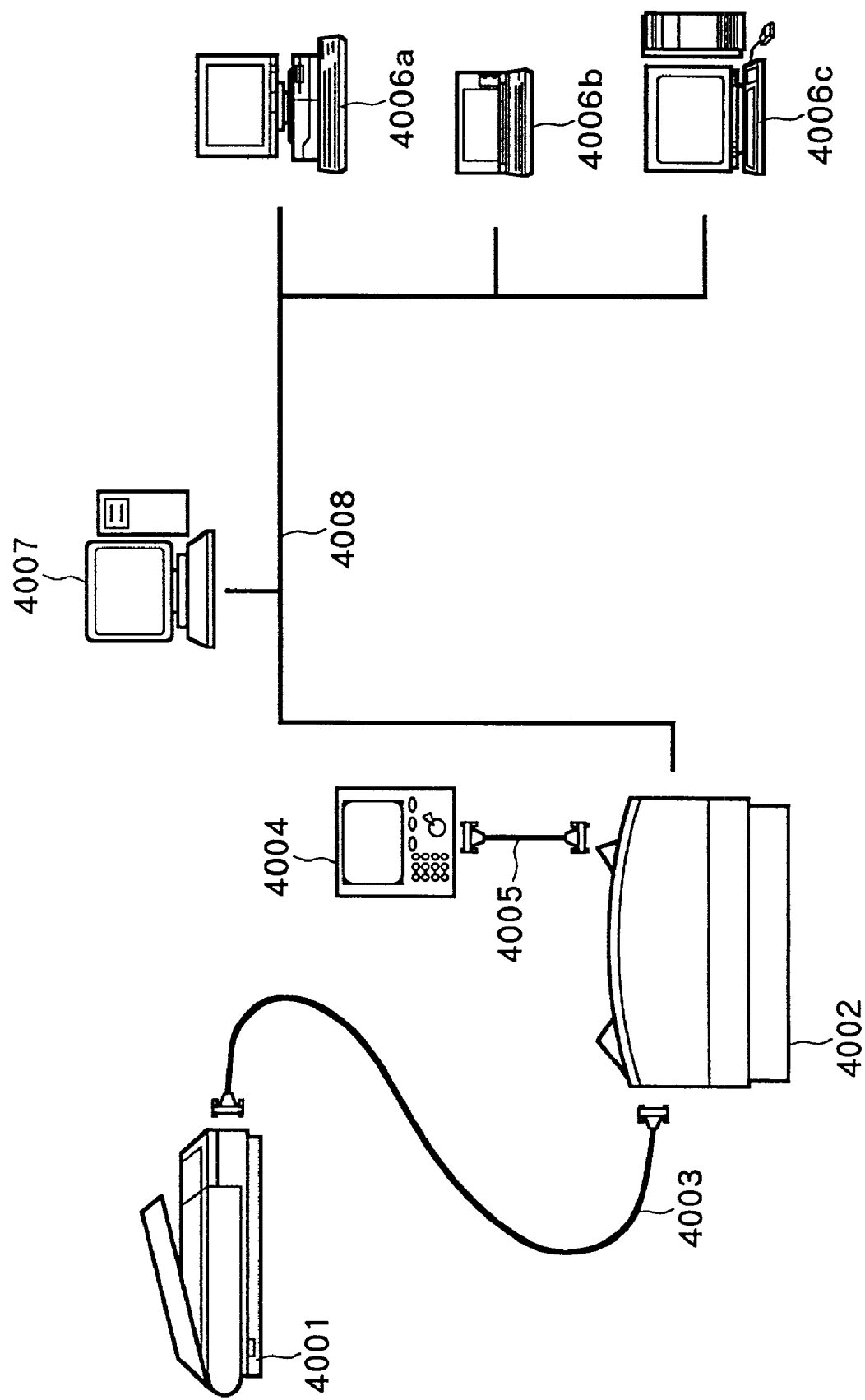
FIG. 25 is a diagram showing the system arrangement of a conventional digital copying machine.
Figure 28:
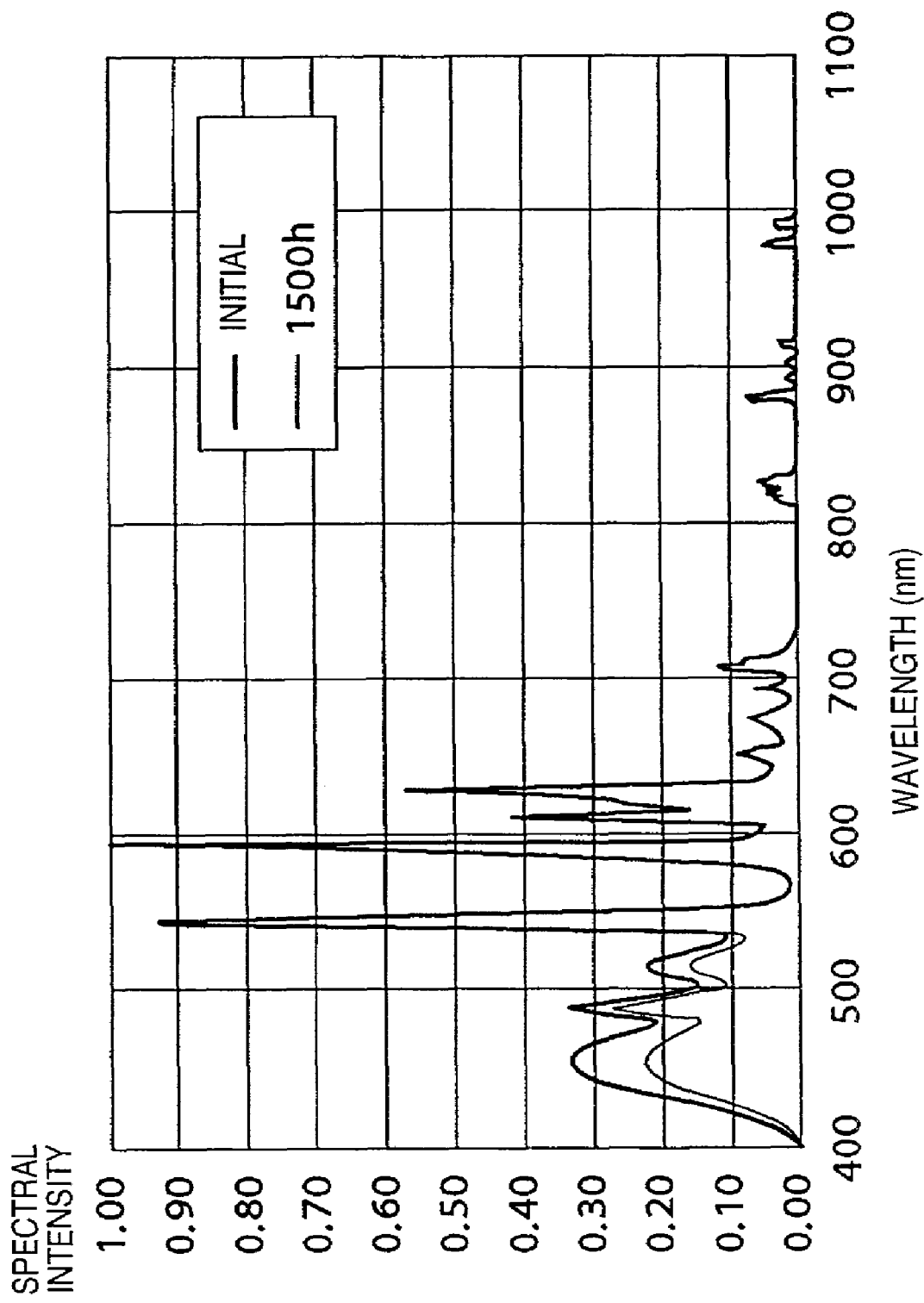
FIG. 28 is a graph showing the emission spectral characteristics of a white xenon lamp.

FIG. 24 shows the relationship between the zoom ratio and color misregistration amount. The color misregistration amount is a deviation from an ideal imaging position (imaging position upon design), and when the image scanning apparatus 100 realizes a sub-scan zoom process by changing its scan speed, the color misregistration amount linearly changes in correspondence with the zoom ratio.

This phenomenon will be explained below with reference to FIG. 26. In an equal-magnification scan, the distance between R and G light beams that form images on the CCD line sensor 101 corresponds to 7.891 lines and the color misregistration amount is 0.109 lines in case of the above example.

In a 400% enlarged scan, the scan speed is ¼ that in the equal-magnification scan. At this time, an ideal line spacing between colors on the imaging surface of the CCD line sensor 101 is 32 lines (=8 lines×4). Since the imaging position does not depend on the scan speed, the color misregistration amount changes in proportion to a change in line spacing of the CCD line sensor 101, and becomes 0.436 lines (=0.109 lines×4).

Therefore, the color misregistration amount y (lines) and zoom ratio x (%) satisfy:

$$y=0.109x \qquad (3)$$

The slope is obtained as follows.

(1) Upon delivery from a factory, image scans are made at zoom ratios of 100% and 400% using a line chart in which lines are arranged regularly in the sub-scan direction.

(2) The color misregistration amounts are computed from images scanned at zoom ratios of 100% and 400%, and if CC(100) and CC(400) represent these color misregistration amounts, a slope AA is calculated by:

$$AA=(CC(400)-CC(100))/300 \qquad (4)$$

In FIG. 24, since the y-intercept of the color misregistration characteristic graph is zero, the slope can be computed from only the image scanned at the zoom ratio of 100%. However, it is impossible to scan an image at a zoom ratio of 0%, and the slope is preferably computed in accordance with equation (4) based on the color misregistration amounts within a practical zoom ratio range. Upon determining the slope, the number of samples, zoom ratio, slope computation method, and the like are not particularly limited. For example, a line chart may be scanned from a zoom ratio of 100% to 400% in 10%-increments, the color misregistration amounts of the scanned images may be measured, and linear approximation may be made by the method of least squares.

(3) The color misregistration amount CC(100) and slope AA upon 100% scan are saved in the backup RAM 108.

From system startup, color misregistration correction upon zoom scan is made as follows.

(1) Upon starting up the system, the image scanning apparatus 100 informs the image processing apparatus 150 of information (color misregistration characteristic data) that is saved in the backup PAM 108 and pertains to color misregistration correction. More specifically, the color misregistration amount CC(100) and slope AA with respect to the zoom ratio upon 100% scan are transferred from the image scanning apparatus 100 to the image processing apparatus 150.

(2) A copy instruction at a zoom ratio of BB% is issued from the console 180.

The second CPU 155 of the image processing apparatus 150 issues a scan instruction at a zoom ratio of BB% to the image scanning apparatus 100, computes a color misregistration amount CC(BB) at the designated zoom ratio by:

$$CC(BB)=CC(100)+(AA*100)/(BB-100) \qquad (5)$$

and sets the computation result in the color misregistration correction circuit 758.

(3) The image scanning apparatus 100 executes an image scan, and the image processing apparatus 150 corrects the misregistration amount by the color misregistration amount that matches the zoom ratio.

As described above, according to the eighth embodiment, since the color misregistration amount to be corrected is computed in correspondence with the zoom ratio, even a system that realizes the sub-scan zoom process by changing the scan speed can execute optimal color misregistration correction corresponding to the zoom ratio. Therefore, deterioration of text reproduction caused by color misregistration can be prevented, and reproduction of text quality can be maintained.

In the above embodiment, the correction amount in the line spacing correction circuit 153 is fixed. Alternatively, this correction amount may be changed on the basis of information (line spacing) supplied from the image scanning apparatus 100, i.e., the specification of the image scanning apparatus.

Other Embodiment

The present invention can be applied to a system constituted by a plurality of devices (eg., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing system constituted by connecting an image sensing apparatus and image processing apparatus,
said image sensing apparatus comprising:
an image sensing unit adapted to sense an original and output image data of the original, wherein said image sensing unit includes an image sensor which has a plurality of photoelectric conversion element arrays for respectively photoelectrically converting light of a plurality of colors;
a shading correction unit adapted to apply shading correction to the image data output from said image sensing unit;
a storage medium adapted to hold data on image sensing characteristic including spacing between the plurality of photoelectric conversion element arrays and spatial positional deviations of the plurality of colors of pixel signals, obtained by said plurality of photoelectric conversion element arrays within a single chip of said image sensor, with respect to one of said pixel signals obtained by one of said plurality of photoelectric conversion element arrays; and
an output unit adapted to output shading-corrected image data and the data on image sensing characteristic held in said storage medium to said image processing apparatus, and
said image processing apparatus comprising:
an input unit adapted to receive the image data and the data on image sensing characteristic output from said image sensing apparatus;
a line spacing correction unit adapted to correct the image data for line deviations between the plurality of colors based on the spacing between the plurality of photoelectric conversion element arrays;
a generation unit adapted to generate image sensing characteristic correction data on the basis of the spatial positional deviations of the plurality of colors of pixel signals; and
an image sensing characteristic correction unit adapted to correct influence of an image sensing characteristic on the line-deviation-corrected image data using the image sensing characteristic correction data generated by said generation unit.

2. The system according to claim 1, wherein the image sensing characteristic is a linearity characteristic.

3. The system according to claim 1, wherein the image sensing characteristic includes a characteristic for each of a plurality of colors to be sensed.

4. The system according to claim 1, wherein the data on image sensing characteristic is output from said image sensing apparatus to said image processing apparatus upon starting up said image sensing apparatus.

5. The system according to claim 1, wherein said generation unit generates the image sensing characteristic correction data by inversely converting the data on image sensing characteristic.

6. The system according to claim 1, wherein said image sensing apparatus further comprises updating unit adapted to, when an exchangeable unit including said image sensor is exchanged, update the data on image sensing characteristic held in said storage medium in accordance with a characteristic of the unit.

7. The system according to claim 1, wherein when the data on image sensing characteristic held in said storage medium is updated, said output unit outputs the updated data on image-sensing characteristic to said image processing apparatus.

8. The system according to claim 1, wherein said image sensing apparatus further comprises an optical element which brings about a change in spatial positional deviation amount of the plurality of colors of pixel signals obtained by the plurality of photoelectric conversion element arrays of said image sensor, and
the data on image sensing characteristic includes basic data which indicates a basic amount of the positional deviation amount, and auxiliary data which indicates a change characteristic of the positional deviation amount.

9. The system according to claim 8, wherein said optical element is controlled or adjusted in accordance with a magnification of an image sensed by said image sensor.

10. The system according to claim 1, wherein the data on image sensing characteristic includes data which indicates a relationship between actual positions at which light forms images on the plurality of photoelectric conversion element arrays, and design positions thereof.

11. The system according to claim 1, wherein said image sensing apparatus further comprises an optical system for forming an original image on an imaging surface of said image sensor, and said image sensor senses the original image.

12. The system according to claim 1, wherein said image sensor has the plurality of photoelectric conversion element arrays which are separated at a predetermined line spacing.

13. The system according to claim 1, wherein the plurality of colors are three colors including red (R), green (G), and blue (B), and the data on image sensing characteristic includes data indicating spatial deviation amounts among R, G, and B pixel signals.

14. An image processing apparatus operably connected to an image sensing apparatus, the image sensing apparatus having an image sensing unit adapted to sense an original and output image data of the original, a shading correction unit adapted to apply shading correction to the image data output from said image sensing unit, a storage medium adapted to hold data for an image sensing characteristic including spacing between the plurality of photoelectric conversion element arrays and spatial positional deviations of the plurality of colors of pixel signals, obtained by said plurality of photoelectric conversion element arrays within a single chip of said image sensor, with respect to one of said pixel signals obtained by one of said plurality of photoelectric conversion element arrays and an output unit adapted to output shading-corrected image data and the data for the image sensing characteristic held in said storage medium to said image processing apparatus, said image processing apparatus comprising:

an input unit adapted to receive the image data and the data for the image sensing characteristic output from said image sensing apparatus;

a line spacing correction unit adapted to correct the image data for line deviations between the plurality of colors based on the spacing between the plurality of photoelectric conversion element arrays;

a generation unit adapted to generate image sensing characteristic correction data on the basis of the spatial positional deviations of the plurality of colors of pixel signals; and an image sensing characteristic correction unit adapted to correct influence of an image sensing characteristic of the line deviation-corrected image data using the image sensing characteristic correction data generated by said generation unit.

\* \* \* \* \*